US011170615B2

(12) United States Patent
Nakagawa et al.

(10) Patent No.: US 11,170,615 B2
(45) Date of Patent: Nov. 9, 2021

(54) INFORMATION PROCESSING APPARATUS, INFORMATION PROCESSING METHOD, AND RECORDING MEDIUM

(71) Applicant: SONY CORPORATION, Tokyo (JP)

(72) Inventors: Ayumi Nakagawa, Kanagawa (JP); Ikuo Yamano, Tokyo (JP); Yusuke Nakagawa, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/979,763

(22) PCT Filed: Jan. 21, 2019

(86) PCT No.: PCT/JP2019/001646
§ 371 (c)(1),
(2) Date: Sep. 10, 2020

(87) PCT Pub. No.: WO2019/181167
PCT Pub. Date: Sep. 26, 2019

(65) Prior Publication Data
US 2021/0043052 A1 Feb. 11, 2021

(30) Foreign Application Priority Data

Mar. 19, 2018 (JP) .............................. JP2018-051227

(51) Int. Cl.
H04B 3/36 (2006.01)
G08B 6/00 (2006.01)
(52) U.S. Cl.
CPC ..................................... G08B 6/00 (2013.01)

(58) Field of Classification Search
CPC ... G08B 6/00; G06F 3/01; A63F 13/28; A63F 9/24
See application file for complete search history.

(56) References Cited

U.S. PATENT DOCUMENTS 10,699,538 B2 * 6/2020 Novich .................. G10H 1/045
2001/0003101 A1 * 6/2001 Shinohara ............... A63F 13/22
463/46

(Continued)

FOREIGN PATENT DOCUMENTS

CN 205413335 U 8/2016
EP 1907086 A2 4/2008

(Continued)

Primary Examiner — Toan N Pham
(74) Attorney, Agent, or Firm — Paratus Law Group, PLLC

(57) ABSTRACT

There is provided a mechanism capable of suppressing deterioration in user experience accompanied by feedback due to vibration. An information processing apparatus includes an acquisition unit that acquires vibration information for outputting intermittent vibration to an actuator; and a setting unit that sets an operation mode of a plurality of actuators capable of outputting vibration to the same user based on the vibration information as a first operation mode in which the same actuator continuously outputs each of the intermittent vibrations based on the vibration information or as a second operation mode in which the plurality of actuators share the intermittent vibrations while the same actuator discontinuously outputs each of the intermittent vibrations based on the vibration information.

17 Claims, 12 Drawing Sheets

(56) References Cited

U.S. PATENT DOCUMENTS

| | | |
|---|---|---|
| 2003/0216180 A1* | 11/2003 | Shinohara ............... A63F 13/06 463/37 |
| 2006/0290662 A1 | 12/2006 | Houston et al. |
| 2013/0229384 A1 | 9/2013 | Adachi et al. |
| 2014/0324331 A1 | 10/2014 | Ooka |
| 2016/0063826 A1 | 3/2016 | Morrell et al. |
| 2016/0103491 A1 | 4/2016 | Taninaka et al. |
| 2016/0195931 A1 | 7/2016 | Czelnik et al. |
| 2017/0052593 A1 | 2/2017 | Jiang et al. |
| 2018/0065151 A1 | 3/2018 | Houston et al. |

FOREIGN PATENT DOCUMENTS

| | | |
|---|---|---|
| JP | 2005-258666 A | 9/2005 |
| JP | 2008-546534 A | 12/2008 |
| JP | 2013-511108 A | 3/2013 |
| JP | 2015-196218 A | 11/2015 |
| JP | 2015-232786 A | 12/2015 |
| JP | 2016-053778 A | 4/2016 |
| JP | 2017-167577 A | 9/2017 |
| JP | 2017-182496 A | 10/2017 |
| JP | 2017-208067 A | 11/2017 |
| JP | 2018-026121 A | 2/2018 |
| JP | 2018-037077 A | 3/2018 |
| WO | WO 2007/002775 A2 | 1/2007 |
| WO | WO 2017/094211 A1 | 6/2017 |

* cited by examiner

FIG.6
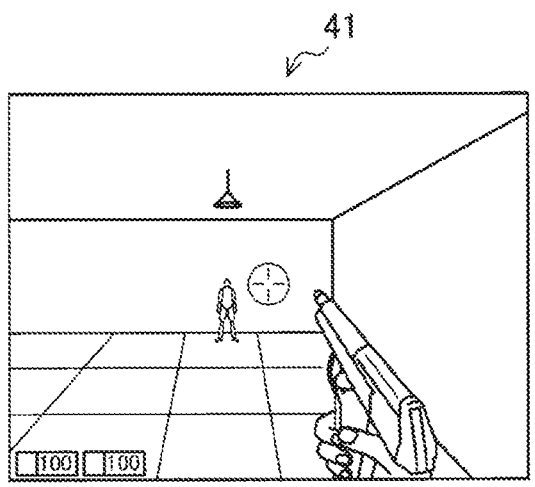
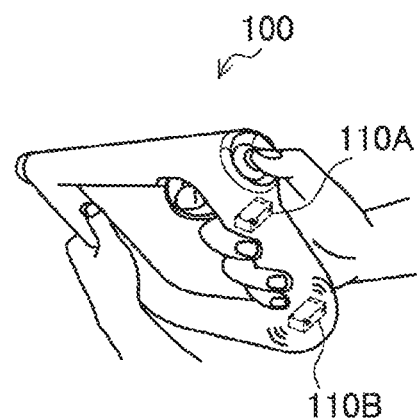
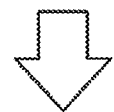
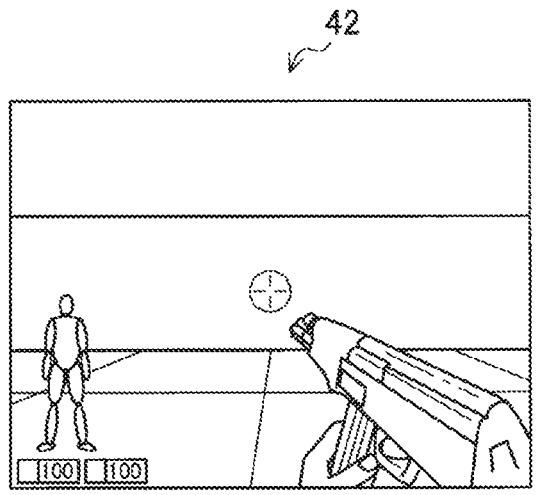
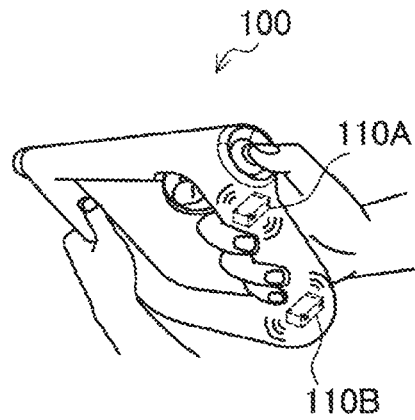

FIG.7
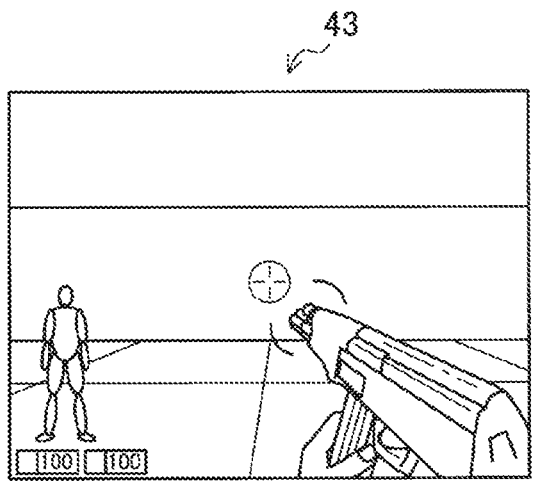
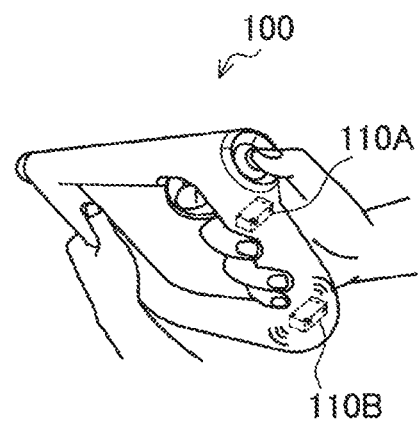
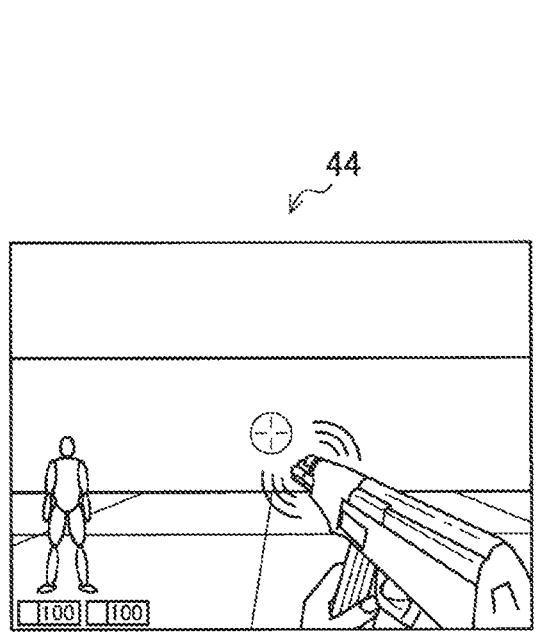
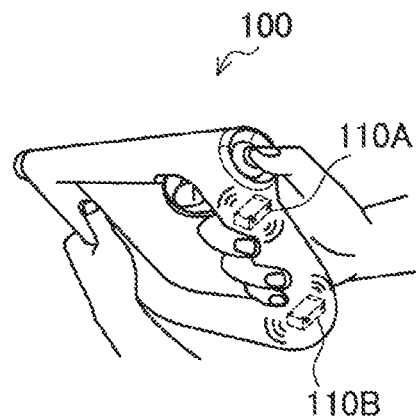

FIG.11
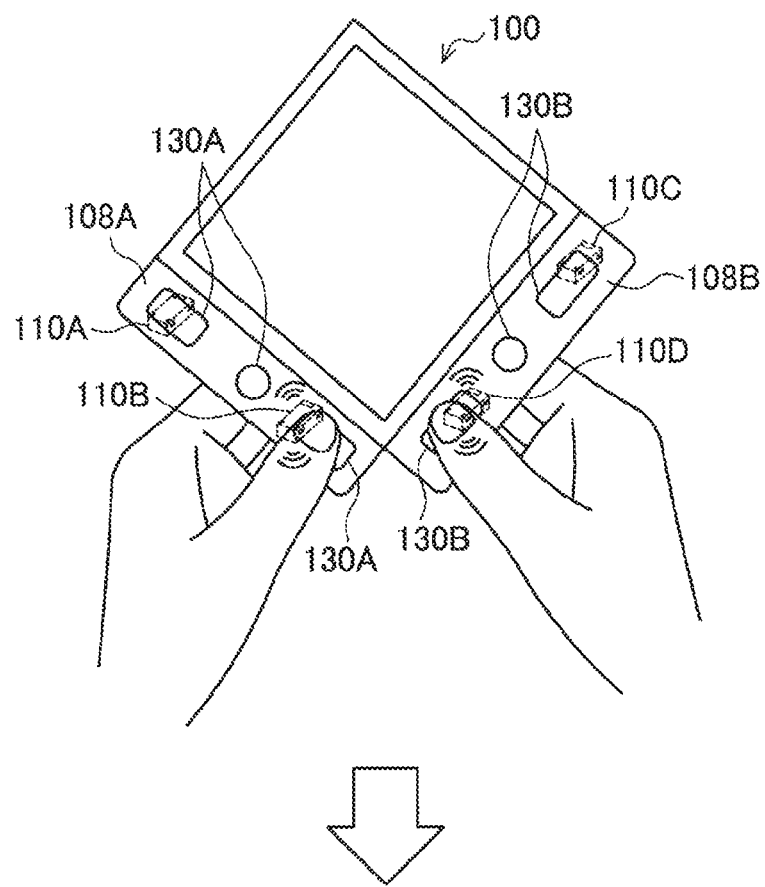
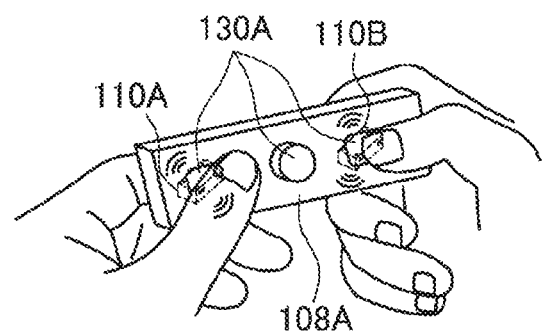

INFORMATION PROCESSING APPARATUS, INFORMATION PROCESSING METHOD, AND RECORDING MEDIUM

CROSS REFERENCE TO PRIOR APPLICATION

This application is a National Stage Patent Application of PCT International Patent Application No. PCT/JP2019/001646 (filed on Jan. 21, 2019) under 35 U.S.C. § 371, which claims priority to Japanese Patent Application No. 2018-051227 (filed on Mar. 19, 2018), which are all hereby incorporated by reference in their entirety.

FIELD

The present invention relates to an information processing apparatus, an information processing method, and a recording medium.

BACKGROUND

A user device including an actuator that outputs vibrations has been widely used. One example is a controller of a game console. By using an actuator provided in a controller to feedback vibrations to a user who grips and operates the controller according to a game situation, the feeling of immersion in the game can be further enhanced. Such user devices may be equipped with a plurality of actuators. In order to feedback appropriate vibrations to a user, control technologies for the plurality of actuators have been developed.

For example, Non Patent Literature 1 below discloses a technology of controlling a plurality of actuators arranged in an input area of a user device and feeding back similar vibrations at any point in the input area.

CITATION LIST

Patent Literature

Patent Literature 1: JP 2005-258666 A

SUMMARY

Technical Problem

The actuator is a device that outputs vibrations based on input vibration information. When the arrangement or the like of the actuators or the actuators in the user device is different, even if the input vibration information is the same, the output vibrations may be different. Therefore, depending on the user device, vibration that should be perceived by a user as intermittent vibration may be perceived by the user as continuous vibration, which may cause the deterioration in the user experience. Considering that various user devices can be used, it is desirable to suppress such deterioration in the user experience.

Therefore, the present disclosure proposes a mechanism capable of suppressing deterioration in user experience accompanied by feedback due to vibration.

Solution to Problem

According to the present disclosure, an information processing apparatus is provided that includes: an acquisition unit that acquires vibration information for outputting intermittent vibration to an actuator; and a setting unit that sets an operation mode of a plurality of actuators capable of outputting vibration to the same user based on the vibration information as a first operation mode in which the same actuator continuously outputs each intermittent vibration based on the vibration information or as a second operation mode in which the plurality of actuators share the intermittent vibrations while the same actuator discontinuously outputs each of the intermittent vibrations based on the vibration information.

Moreover, according to the present disclosure, an information processing method is provided that includes: acquiring vibration information for outputting intermittent vibration to an actuator; and setting, by a processor, an operation mode of a plurality of actuators capable of outputting vibration to the same user based on the vibration information as a first operation mode in which the same actuator continuously outputs each intermittent vibration based on the vibration information or as a second operation mode in which the plurality of actuators share the intermittent vibrations while the same actuator discontinuously outputs each of the intermittent vibrations based on the vibration information.

Moreover, according to the present disclosure, a recording medium is provided that records a program for causing a computer to function as: an acquisition unit that acquires vibration information for outputting intermittent vibration to an actuator; and a setting unit that sets an operation mode of a plurality of actuators capable of outputting vibration to the same user based on the vibration information as a first operation mode in which the same actuator continuously outputs each of the intermittent vibrations based on the vibration information or as a second operation mode in which the plurality of actuators share the intermittent vibrations while the same actuator discontinuously outputs each of the intermittent vibrations based on the vibration information.

Advantageous Effects of Invention

As described above, according to the present disclosure, a mechanism capable of suppressing deterioration in user experience accompanied by feedback due to vibration is provided. It should be noted that the above effects are not necessarily limited, and any effects illustrated in the present specification or other effects that can be grasped from the present specification can be achieved together with or instead of the above effects.

BRIEF DESCRIPTION OF DRAWINGS

FIG. 6 is a diagram for explaining an example of setting an operation mode based on dynamic information according to the present embodiment.

FIG. 7 is a diagram for explaining another example of setting the operation mode based on the dynamic information according to the present embodiment.

FIG. 11 is a diagram for explaining another example of selecting the actuator according to the present embodiment.

Description of Embodiments

Figure 1:
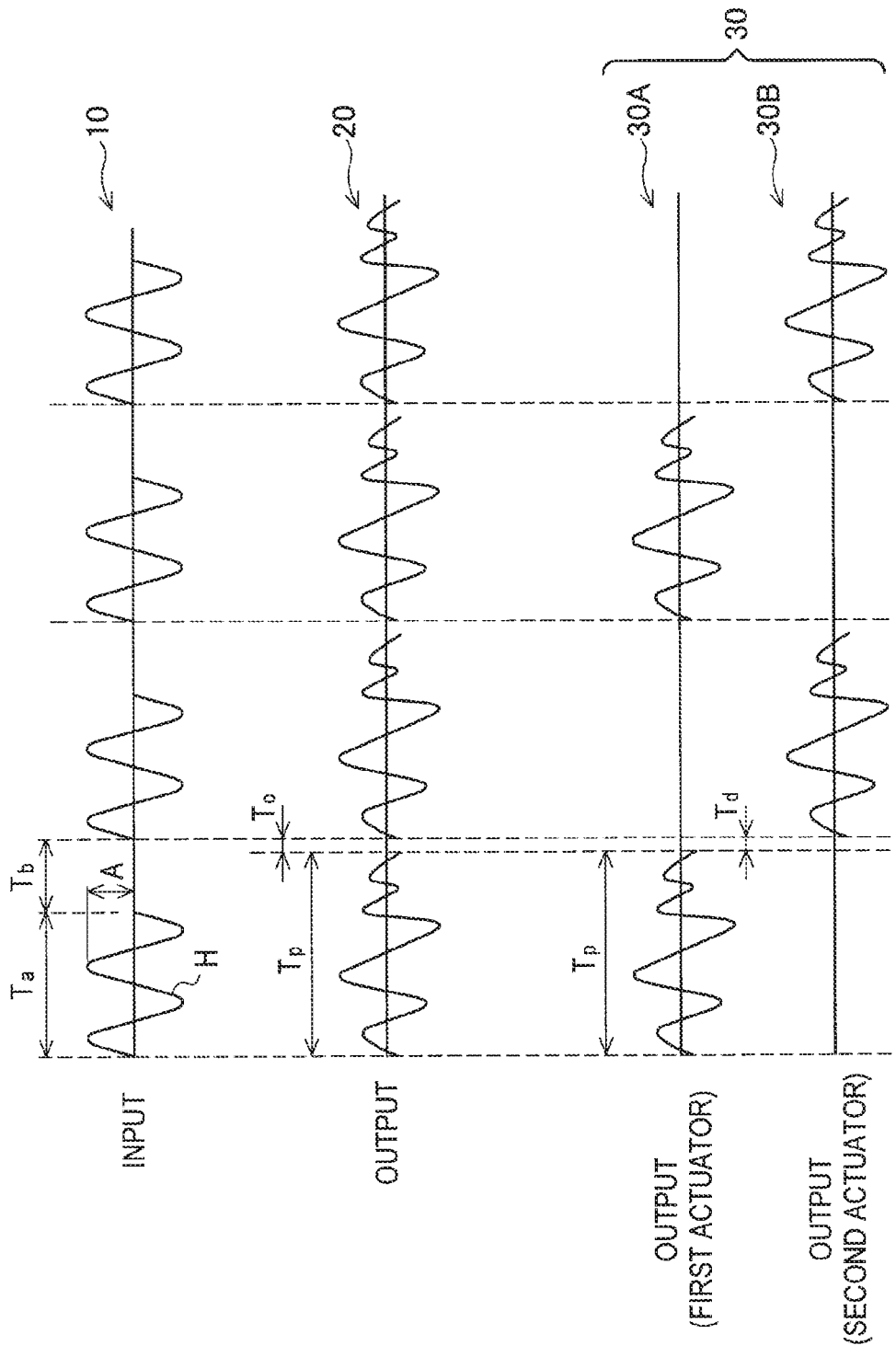
FIG. 1 is a diagram for explaining an overview of a proposed technology.

Hereinafter, preferred embodiments of the present disclosure will be described in detail with reference to the accompanying drawings. Note that in this specification and the drawings, components having substantially the same functional configuration are designated by the same reference numerals, and duplicate description thereof will be omitted.

In addition, in the present specification and the drawings, components having substantially the same functional configuration may be distinguished by attaching different alphabets after the same reference numerals. For example, a plurality of components having substantially the same functional configuration are distinguished as user devices 100A, 100B, and 100C as needed. However, when it is not necessary to specifically distinguish each of the plurality of components having substantially the same functional configuration, only the same reference numerals are given to the components. For example, when it is not necessary to specifically distinguish the user devices 100A, 100B, and 100C, the user devices 100A, 100B, and 100C are simply referred to as the user device 100A.

Note that the description will be given in the following order.

1. Overview
2. Configuration Example
2.1. Appearance Configuration Example of User Device
2.2. Internal Configuration. Example of Information Processing System
2.2.1. Internal Configuration Example of User Device
2.2.2. Internal Configuration Example of Information Processing Apparatus
3. Technical Features
3.1. Vibration Information
3.2. Type of Operation Mode
3.3. Setting of Operation Mode
3.4. Real-time Control
3.4.1. Setting of Operation Mode
3.4.2. Edition of Vibration Information
3.5. Selection of Actuator to Operate
3.6. Flow of Process
4. Example of Hardware Configuration
5. Summary <<1. Overview>>

FIG. 1 is a diagram for explaining an overview of a proposed technology. FIG. 1 illustrates a state in which vibration information 10 is input to a user device including a plurality of actuators and vibration 20 or vibration 30 is output. For each waveform illustrated in FIG. 1, a horizontal axis indicates time, the time flows from left to right, a vertical axis indicates amplitude, and the greater the distance from the horizontal axis, the greater the amplitude. An input vibration period $T_a$ in the vibration information 10 indicates a period in which vibration should be output. An input vibration interval $T_b$ in the vibration information 10 indicates an interval in which vibration should be output. In addition, the vibration information 10 also includes waveform information such as amplitude A and frequency H of each vibration.

Here, hereinafter, the output vibration is handled as one vibration based on a continuous waveform in the vibration information 10. That is, the output vibration is handled as one vibration based on the vibration information in the input vibration period $T_a$. In the vibration information 10, a plurality of vibrations are continuous with the input vibration interval $T_b$ interposed therebetween. In other words, the vibration information 10 is vibration information for outputting the intermittent vibration to the actuator.

The vibration 20 illustrated in FIG. 1 is the vibration output from one actuator based on the vibration information 10. An output vibration period $T_p$ indicates a period of vibration output from the actuator. A single output vibration interval $T_o$ indicates an interval (time from an end of a first waveform to a start of a second waveform temporally adjacent to the first waveform) of vibration output from a single actuator. The $T_p$ and $T_o$ and the waveform (amplitude and frequency) are changed depending on the characteristics of the actuator. As illustrated in FIG. 1, the single output vibration interval $T_o$ is a positive value and there is no overlap between adjacent vibrations, so it seems that the intermittent vibration is being output. However, due to circumstances such as the single output vibration interval $T_o$ being too small, the user may perceive the vibration 20 as the continuous vibration instead of the intermittent vibration, which may cause a deterioration in user experience. Such deterioration in the user experience may be caused by various circumstances such as the characteristics of the user other than the characteristics of the actuator.

Therefore, in the proposed technology, a plurality of actuators cooperate to output vibration. The vibration 30 (30A and 30B) illustrated in FIG. 1 is the vibration output by the cooperation of two actuators based on the vibration information 10. According to the vibration 30 illustrated in FIG. 1, the first actuator and the second actuator alternately output vibration. An output vibration period $T_p$ indicates a period of vibration output from the actuator. A composite output vibration interval $T_d$ indicates a period (time from the end of the first waveform to a start of the second waveform temporally adjacent to the first waveform) of vibrations output from a plurality of actuators. The $T_p$ and $T_d$ and the waveform (amplitude and frequency) are changed depending on the characteristics of the actuator. As illustrated in FIG. 1, the composite output vibration interval $T_d$ is a positive value, and adjacent vibrations do not overlap. On the other hand, the composite output vibration interval $T_d$ has the same interval as the single output vibration interval $T_o$. However, when vibrations are output from a plurality of actuators, a user tends to easily perceive the vibration as the intermittent vibration. This is because the user easily perceives each of the temporally adjacent vibrations as different vibrations due to factors such as a difference in a relative position between the user and each actuator and/or a difference in characteristics between the respective actuators. Therefore, according to the proposed technology, the user can perceive, as the intermittent vibration, the output vibration 30 based on the vibration information 10 designed to output the intermittent vibration to the actuator. In this way, the deterioration in the user experience is suppressed.

Although the single output vibration interval $T_o$ and the composite output vibration interval $T_d$ are illustrated as the same positive values in FIG. 1, the proposed technology is not limited to this example. The single output vibration interval $T_o$ and the composite output vibration interval $T_d$ may be different values. The single output vibration interval $T_o$ may be 0. Further, the composite output vibration interval $T_d$ may be a negative value. That is, when the plurality of actuators cooperate to output vibrations, even when the temporally adjacent vibrations overlap, the user can perceive the vibration as the intermittent vibration.

<<2. Configuration Example>>

Hereinafter, a configuration example of the information processing system to which the above-described proposed technology is applied will be described with reference to FIGS. 2 and 3. The information processing system according to the present embodiment includes a user device including a plurality of actuators, and an information processing apparatus that executes various processes for realizing the proposed technology.

<2.1. Appearance Configuration Example of User Device

Figure 2:
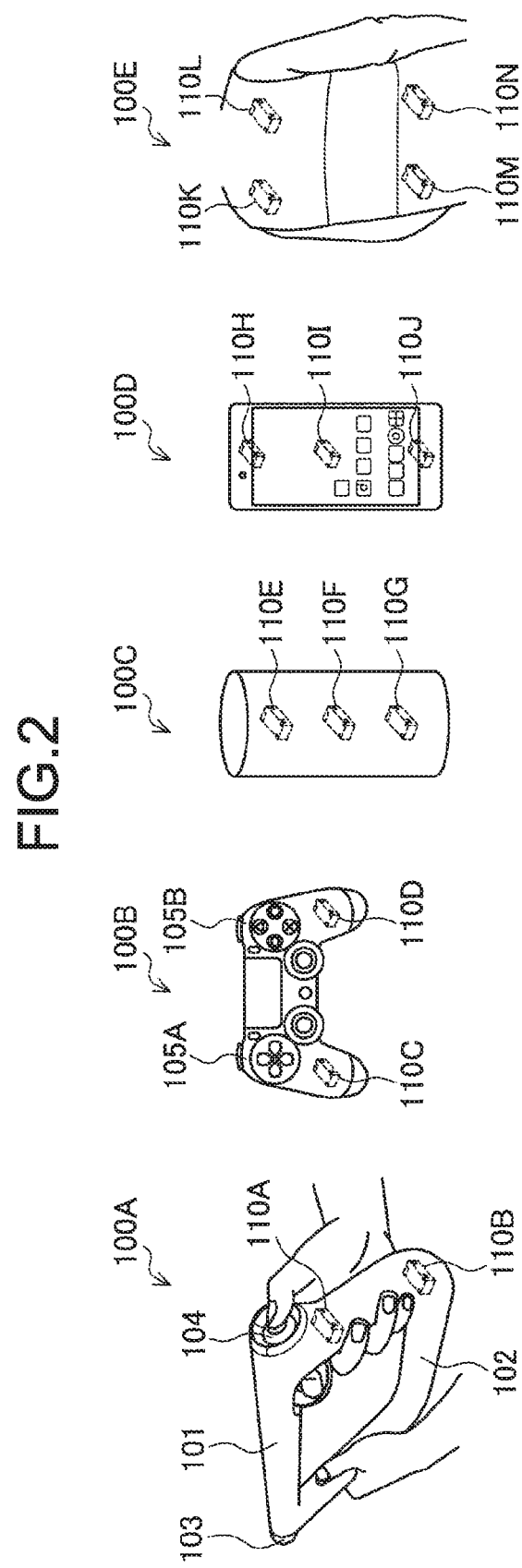
FIG. 2 is a diagram for explaining an example of an appearance configuration of a user device according to the present embodiment.

FIG. 2 is a diagram for explaining an example of an appearance configuration of a user device according to the present embodiment. As illustrated in FIG. 2, a user device 100 may be implemented in various ways.

A user device 100A is a gun-type game controller. The user device 100A includes a linear barrel part 101 and a substantially U-shaped grip part 102 connected to a lower portion of the barrel part 101. The user grips a grip part 102 with both hands, directs a tip 103 of the barrel part 101 toward a game screen, and operates buttons and the like provided at a rear end 104 of the barrel part 101 and each position of the grip part 102, and the like, and as a result, can shoot at a desired target in the game. The user device 100A includes actuators 110A and 110B inside the grip part 102. The actuators 110A and 110B are arranged while being linearly apart from each other.

A user device 100B is a game controller. The user device 100B includes a grip part 105A gripped by a left hand and a grip part 105B gripped by a right hand. The user can play the game by operating buttons and the like provided on a surface of the user device 100B with a thumb, an index finger, and the like while gripping the grip part 105A with the left hand and gripping the grip part 105B with the right hand. The user device 100B includes actuators 110C and 110D inside the grip parts 105A and 105B, respectively.

A user device 100C is a bar-shaped game controller. The user can play the game by moving while gripping the user device 100C. The user device 100C has actuators 110E, 110F, and 100G provided therein. The actuators 110E, 110F, and 100G are arranged while being apart from one end to the other end of the bar-shaped user device 100C.

A user device 100D is a smartphone. The user device 100D includes actuators 110H, 110I, and 110J provided therein. The actuators 110H, 110I, and 110J are arranged while being linearly apart from each other.

The user device 100E is a vest type wearable device. The user can input various operations to the user device 100E by moving a body while wearing the user device 100E. The user device 100E includes actuators 110K, 110L, 110M, and 110N provided therein. The actuators 110K and 110L are arranged at a position corresponding to a user's scapula at the time of wearing, and the actuators 110M and 110N are arranged at a position corresponding to a user's waist at the time of wearing.

<2.2. Internal Configuration Example or Information Processing System>

Next, an internal configuration of the information processing system according to the present embodiment will be described with reference to FIG. 3. FIG. 3 is a block diagram illustrating an internal configuration of an information processing system 1 according to the present embodiment. As illustrated in FIG. 3, the information processing system 1 according to the present embodiment includes the user device 100 and an information processing apparatus 200.

<2.2.1. Internal Configuration Example of User Device>

Figure 3:
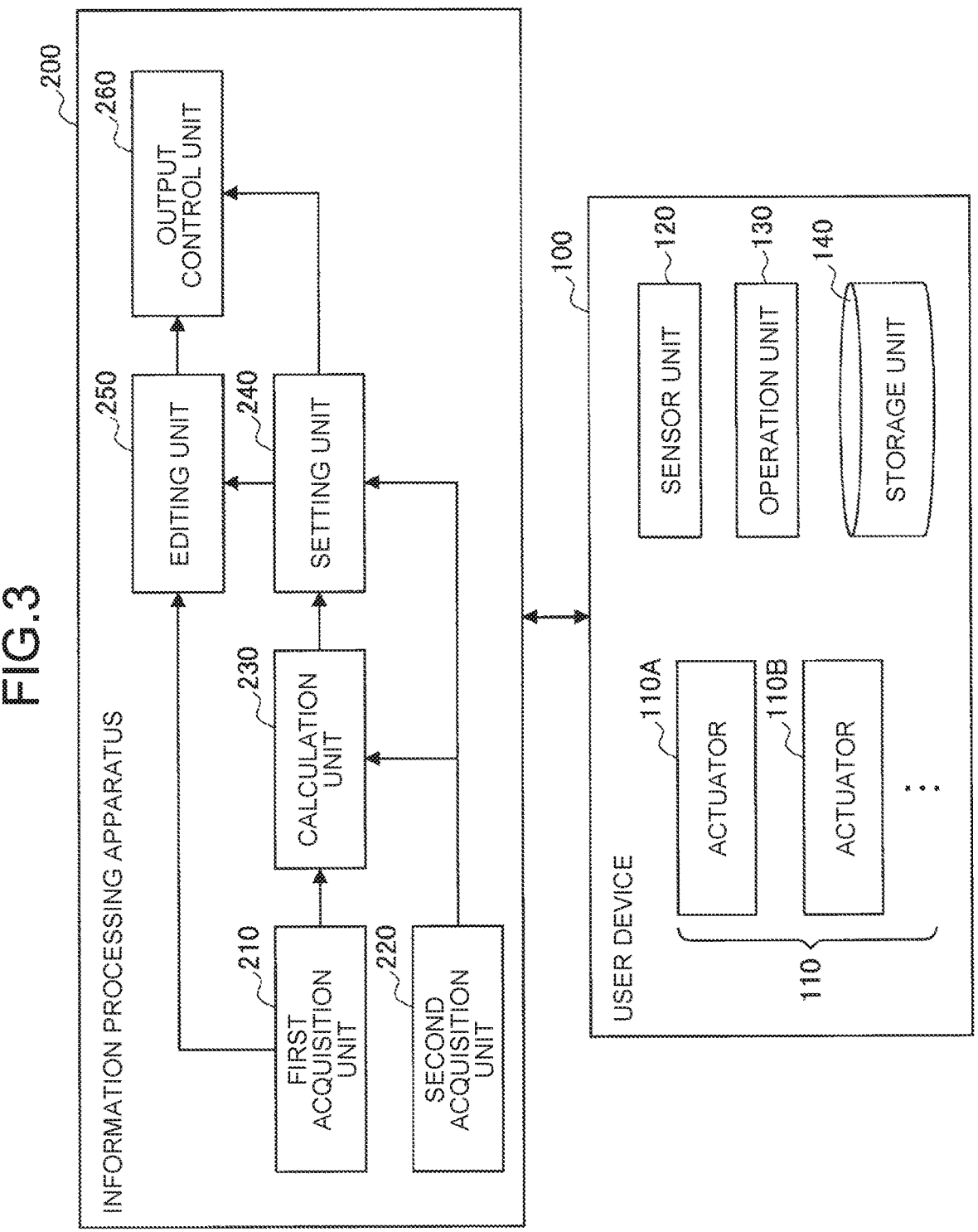
FIG. 3 is a block diagram illustrating an internal configuration of an information processing system according to the present embodiment.

As illustrated in FIG. 3, the user device 100 includes the actuator 110, a sensor unit 120, an operation unit 130, and a storage unit 140.

The actuator 110 is a vibration output device that outputs vibration. As illustrated in FIG. 3, the user device 100 includes a plurality of actuators 110 such as the actuators 110A and 110B. Under the control of an output control unit 260, the plurality of actuators 110 can output vibration to the same user based on the vibration information. Here, the user is a user who grips, wears, or the like the user device 100 and contacts the user device 100. The number of users may be one or plural.

The actuator 110 can be implemented by, for example, an eccentric motor, a linear resonant actuator (LRA) or a voice coil motor (VCM). The LRA is a device that can change the frequency of the output vibration, and tends to shorten a rise time and a fall time. The VCM is a device that can output the vibration with large acceleration.

The sensor unit 120 is a device that senses various information. The sensor unit 120 senses information on the user device 100, the actuator 110, or the user.

For example, the sensor unit 120 detects a contact state between the user and the user device 100. The contact state is a contact strength (that is, pressure) between the user device 100 and the user, a contact area, a contact portion of the user device 100, a contact portion of the user's body, and the like. The sensor unit 120 may include a biological information sensor, a pressure sensor, an infrared sensor, and/or an image pickup device, or the like.

For example, the sensor unit 120 detects a state of the actuator 110. Examples of the state of the actuator 110 include a temperature, a driving time, and the like of the actuator 110. The sensor unit 120 may include a temperature sensor and/or a timer, or the like.

For example, the sensor unit 120 detects a state of the vibration output from the actuator 110. Examples of the state of the vibration include an intensity (amplitude or driving power), an interval, a period, a frequency, and the like of the vibration actually output from the actuator 110. The sensor unit 120 may include a vibration sensor that detects vibration based on displacement, speed, or acceleration.

For example, the sensor unit 120 detects the state of the user device 100. Examples of the state of the user device 100 include acceleration, speed, position/posture, and the like of the user device 100. The sensor unit 120 may include an acceleration sensor, a speed sensor, an inertial sensor, a global navigation satellite system (GNSS) positioning device, and/or an imaging device, or the like.

The operation unit 130 is a device that receives an operation input from a user. Typically, the operation unit 130 receives the operation input to content (for example, a game) provided to the user in synchronization with the vibration information. The synchronization of the vibration information and the content means that the vibration information is provided according to the situation of the content. For example, the vibration information is provided to cause the actuator 110 to output vibration indicating a reaction or an attack at the time of shooting at timing when a character operated by a user in a game shoots a gun, receives an attack, or the like. The operation unit 130 is implemented by a button, a mouse, a keyboard, a touch panel, a microphone, a switch, a lever, or the like.

The storage unit 140 is a device that temporarily or permanently stores the information on the user device 100. The storage unit 140 stores characteristics of the user device 100 and the characteristics of the actuator 110. For example, the storage unit 140 is implemented by a magnetic storage device such as an HDD, a semiconductor storage device, an optical storage device, a magneto-optical storage device, or the like.

<2.2.2. Internal Configuration Example of Information Processing Apparatus>

As illustrated. in FIG. 3, the information processing apparatus 200 includes a first acquisition unit 210, a second acquisition unit 220, a calculation unit 230, a setting unit 240, an editing unit 250, and the output control unit 260.

The first acquisition unit 210 has a function of acquiring the vibration information. The first acquisition unit 210 outputs the acquired vibration information to the calculation unit 230 and the editing unit 250.

The second acquisition unit 220 has a function of acquiring information used for determining which operation mode the setting unit 240 sets. The second acquisition unit 220 outputs the acquired information to the calculation unit 230 and the setting unit 240.

The calculation unit 230 has a function of calculating an index of intermittency described later based on the information acquired by the first acquisition unit 210 and the second acquisition unit 220. The calculation unit 230 outputs information indicating the calculated index of intermittency to the setting unit 240.

The setting unit 240 has a function of performing various settings for outputting vibration to the actuator 110 based on the vibration information. For example, the setting unit 240 sets an operation mode or selects the actuator 110 that outputs the vibration. The setting unit 240 outputs information indicating the setting result to the editing unit 250 and the output control unit 260.

The editing unit 250 has a function of editing the vibration information acquired by the first acquisition unit 210 based on the setting by the setting unit 240. The editing unit 250 may or may not edit the vibration information. The editing unit 250 outputs, to the output control unit 260, the edited vibration information when the vibration information is edited, and the vibration information acquired by the first acquisition unit 210 as it is when the vibration information is not edited.

The output control unit 260 has a function of controlling the plurality of actuators 110 included in the user device 100 based on the setting by the setting unit 240 and outputting the vibration based on the vibration information output from the editing unit 250.

The example of the internal configuration of the information processing apparatus 200 has been described above. Detailed operations of these components will be described later.

<<3. Technical Features>>

<3.1. Vibration Information>

The first acquisition unit 210 acquires the vibration information for outputting the intermittent vibration to the actuator 110. The vibration information includes waveform information such as the amplitude and the frequency of each vibration, the input vibration period $T_a$ of each vibration, and the input vibration interval $T_b$ between the temporally adjacent vibrations. The information may be different from or the same for each vibration.

The vibration information may be synchronized with the content provided to the user. For example, the first acquisition unit 210 acquires vibration information corresponding to the impact of the gun at timing when the character in the game shoots the gun. When the content is a game, the vibration information can be provided from the game software. Of course, the content is not limited to the game, and may be a movie, music, a TV drama, or the like.

<3.2. Type of Operation Mode>

The setting unit 240 sets the operation mode of the plurality of actuators 110. For example, the setting unit 240 is set in a first operation mode or a second operation mode described below.

First Operation Mode

The first operation mode is an operation mode in which the same actuator 110 continuously outputs each of the intermittent vibrations based on the vibration information. In other words, the operation mode is an operation mode in which the actuator 110 that outputs the vibration based on the vibration information is fixed. The number of operating actuators 110 may be one or plural. The vibration 20 illustrated in FIG. 1 is an example of the vibration output in the operation mode.

According to the operation mode, the deterioration in the user experience can be suppressed as long as the user perceives the vibration 20 as the intermittent vibration. In addition, according to the operation mode, the number of operating actuators 110 can be limited to a small number (for example, one). Therefore, it is possible to improve the user experience, for example, by operating a specific actuator 110 having relatively good performance. Further, for example, the user experience can be improved by operating the specific actuator 110 provided at a position (for example, a position near a palm) where the user can easily perceive vibration based on the contact state between the user and the user device 100.

Second Operation Mode

The second operation mode is an operation mode in which the plurality of actuators 110 share and output the intermittent vibration while the same actuator 110 discontinuously outputs each of the intermittent vibrations based on the vibration information. Here, the discontinuity means that the actuator 110 outputs vibration once and then pauses without outputting vibrations that are temporally adjacent to the vibration. In other words, the operation mode is an operation mode in which the actuator 110 outputting the vibration based on the vibration information is changed every time the actuator 110 outputs the vibration once, that is, the plurality of actuators 110 alternately output vibration. The vibration 30 illustrated in FIG. 1 is an example of the vibration output in the operation mode. The number of actuators 110 operating in the second operation mode may be two or three or more as illustrated in FIG. 1.

The number of actuators 110 that output the vibration at one time may be one as illustrated in FIG. 1. Of course, the number of actuators 110 outputting the vibration at one time may be plural. For example, regarding the intermittent vibration in the vibration information, the actuators 110A and 110B and the actuators 110C and 110D may alternately output vibration.

Further, a cycle in which each of the plurality of actuators 110 outputs vibrations may be different. For example, regarding the intermittent vibration in the vibration information, the actuator 110A may output the vibration every two, and the actuators 110B and 110C may output vibration every four.

According to the operation mode, even the vibration information that is perceived by the user as the continuous vibration in the first operation mode can be perceived by the user as the intermittent vibration, and the deterioration in the user experience can be suppressed.

Supplement

The operation mode can be understood as the setting related to the control of the plurality of actuators 110. In this case, the operation mode means whether the same actuator 110 continuously outputs each of the intermittent vibrations based on the vibration information or the plurality of actuators 110 share and output the intermittent vibration. The former is the first operation mode and the latter is the second operation mode.

In addition, the operation mode can be understood as the operation mode of the actuator 110 itself. In this case, the operation mode means whether the actuator 110 operates continuously or discontinuously. The former is the first operation mode and the latter is the second operation mode.

<3.3. Setting of Operation Mode>

The setting unit 240 sets the operation mode based on various information. The information used for setting the operation mode is classified into static information that is not changed dynamically or is changed scarcely and dynamic information that is changed dynamically or is changed frequently. All of the information is acquired by the second acquisition unit 220.

(1) Setting Operation Mode Based on Static Information

The setting unit 240 can set the operation mode based on the static information. The setting unit 240 sets the operation mode based on the static information before outputting the vibration based on the vibration information or at an arbitrary timing. When the static information is changed, the setting unit 240 sets the operation mode based on the changed information again. An example of the static information is shown in Table 1 below.

TABLE 1

Example of static information used to set operation mode

| Category | Information | Phenomenon example (This is an example and may be reversed in some cases) |
|---|---|---|
| Characteristics of vibration information | Input vibration interval | Short: It is easy to be perceived as continuous vibration<br>Long: It is easy to be perceived as intermittent vibration |
| | Input vibration period | Short: It is easy to be perceived as intermittent vibration<br>Long: It is easy to be perceived as continuous vibration |
| | Intensity (amplitude and/or voltage value) | Weak: It is easy to be perceived as continuous vibration<br>Strong: It is easy to be perceived as intermittent vibration |
| | Frequency | 200 to 250 Hz: Since sensitivity of human hand is high, it is easy to be perceived as intermittent vibration<br>Frequencies other than the above: Since sensitivity of human hand is low, it is easy to be perceived as continuous vibration<br>(The above numerical range depends on sensitivity characteristics of user) |
| Characteristics of actuator | Frequency-acceleration characteristics | Fundamental frequency F0 close to input frequency (frequency of vibration information): Since there is margin, it is easy to be perceived as continuous vibration<br>Fundamental frequency F0 away from input frequency (frequency of vibration information): It is easy to be perceived as intermittent vibration |
| | Time responsiveness | Long rise/fall time: It is easy to be perceived as continuous vibration<br>Short rise/fall time: It is easy to be perceived as intermittent vibration |
| Characteristics of user device | Weight | Heavy: It is easy to be perceived as continuous vibration<br>Light: It is easy to be perceived as intermittent vibration |
| | Shape | Shape with small contact area with user: It is easy to be perceived as continuous vibration<br>Shape with large contact area with user: It is easy to be perceived as intermittent vibration |
| User characteristics | Frequency sensitivity | Low sensitivity in output vibration: It is easy to be perceived as continuous vibration<br>High sensitivity in output vibration: It is easy to be perceived as intermittent vibration |

As shown in Table 1 above, the setting unit 240 may set the operation mode based on the characteristics of the vibration information. Specifically, the setting unit 240 sets the first operation mode when the characteristics of the vibration information indicate that the vibration output from the actuator 110 is easily perceived as the intermittent vibration. On the other hand, the setting unit 240 sets the second operation mode when the characteristics of the vibration information indicate that the vibration output from the actuator 110 is easily perceived as the continuous vibration. With such a setting reference, it becomes possible to appropriately switch between the first operation mode and the second operation mode. As shown in Table 1 above, the characteristics of the vibration information include the interval, period, intensity (amplitude and/or voltage value), and frequency of each vibration indicated by the vibration information. Note that the period of the vibration is the input vibration interval $T_b$ illustrated in FIG. 1, and the vibration period is the input vibration period $T_a$ illustrated in FIG. 1.

Figure 4:
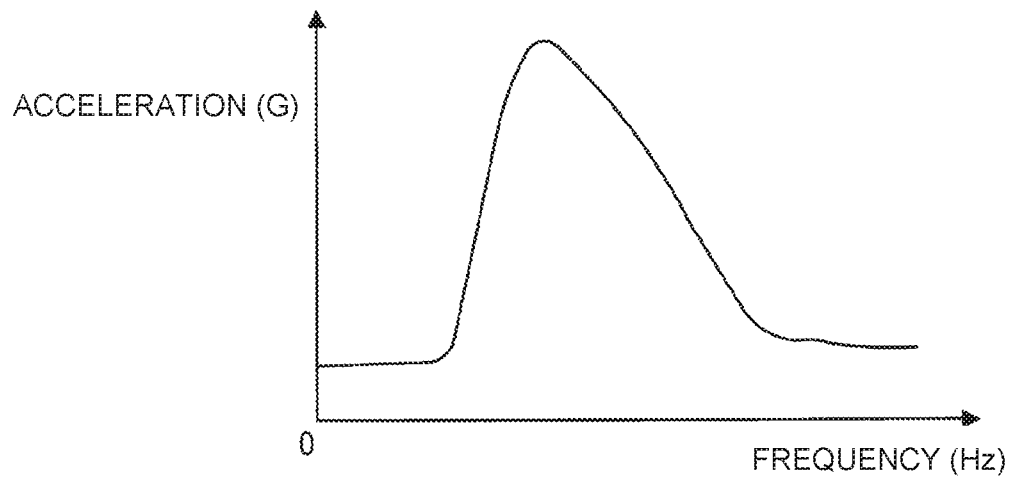
FIG. 4 is a graph illustrating an example of frequency-acceleration characteristics of an actuator according to the present embodiment.
Figure 5:
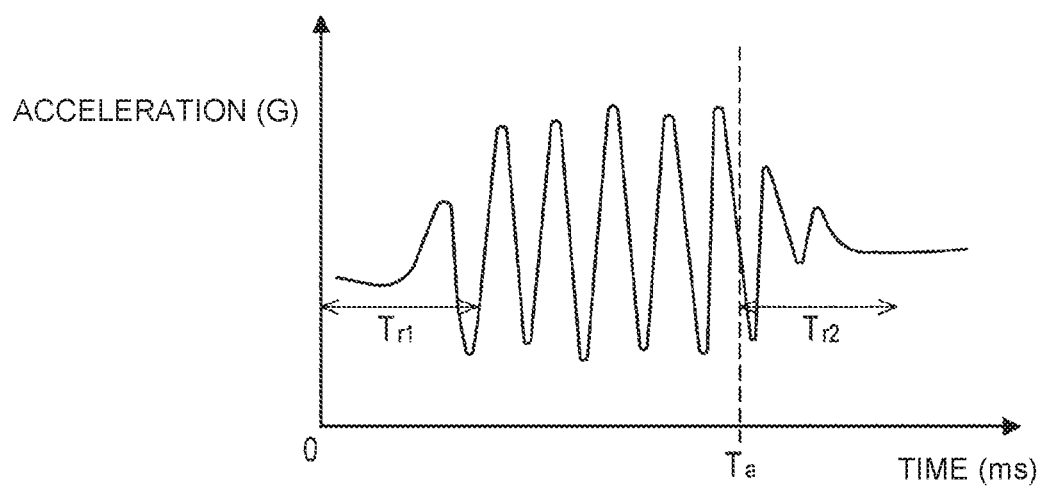
FIG. 5 is a graph illustrating an example of a time response of the actuator according to the present embodiment.

As shown in Table 1 above, the setting unit 240 may set the operation mode based on the characteristics of each of the plurality of actuators 110. Specifically, the setting unit 240 sets the first operation mode when the characteristics of each of the plurality of actuators 110 indicate that the vibration output from the actuator 110 is easily perceived as the intermittent vibration. On the other hand, the setting unit 240 sets the second operation mode when the characteristics of each of the plurality of actuators 110 indicate that the vibration output from the actuator 110 is easily perceived as the continuous vibration. With such a setting reference, it becomes possible to appropriately switch between the first operation mode and the second operation mode. As shown in Table 1 above, the characteristics of the actuator 110 include frequency-acceleration characteristics illustrated in FIG. 4. FIG. 1 is a graph illustrating an example of frequency-acceleration characteristics of the actuator 110 according to the present embodiment. In FIG. 4, a horizontal axis indicates the frequency and a vertical axis indicates the acceleration. In the example illustrated in FIG. 4, the actuator 110 has a mountainous frequency-acceleration characteristic having a peak at a predetermined frequency. In addition, the characteristics of the actuator 110 include the time response illustrated in FIG. 5. FIG. 5 is a graph illustrating an example of the time response of the actuator 110 according to the present embodiment. In FIG. 5, the horizontal axis indicates the time and the vertical axis indicates the acceleration. In the example illustrated in FIG. 5, a state of the output vibration based on the vibration information from time 0 to the input vibration period $T_a$ is illustrated, and an amplitude is maximum after a rise time $T_{r1}$ and the vibration stops after a fall time $T_{r2}$ after the input vibration period $T_a$.

As shown in Table 1 above, the setting unit 240 may set the operation mode based on the characteristics of the user device 100 in which the plurality of actuators 110 are provided. Specifically, the setting unit 240 sets the first operation mode when the characteristics of the user device 100 indicate that the vibration output from the actuator 110 is easily perceived as the intermittent vibration. On the other hand, the setting unit 240 sets the second operation mode when the characteristics of the user device 100 indicate that the vibration output from the actuator 110 is easily perceived as the continuous vibration. With such a setting reference, it becomes possible to appropriately switch between the first operation mode and the second operation mode. As shown in Table 1 above, the characteristics of the user device 100 include a weight and shape of the user device 100.

As shown in Table 1 above, the setting unit 240 may set the operation mode based on the characteristics of the user. Specifically, the setting unit 240 sets the first operation mode when the characteristics of the user indicate that the vibration output from the actuator 110 is easily perceived as the intermittent vibration. On the other hand, the setting unit 240 sets the second operation mode when the characteristics of the user indicate that the vibration output from the actuator 110 is easily perceived as the continuous vibration. With such a setting reference, it becomes possible to appropriately switch between the first operation mode and the second operation mode. As shown in Table 1 above, the characteristics of the user include frequency sensitivity. Note that the characteristics of the user can be measured in advance or acquired based on the user input.

(2) Setting Operation Mode Based on Dynamic Information

The setting unit 240 can set the operation mode based on the dynamic information. The setting unit 240 monitors the dynamic information in real time while outputting the vibration based on the vibration information, and repeats the setting of the operation mode based on the dynamic information. An example of the dynamic information is shown in Table 2 below.

TABLE 2

Example of dynamic information used to set operation mode

| Category | Information | Phenomenon example (This is an example and may be reversed in some cases) |
|---|---|---|
| Information acquired in real time | Content | Scene where gun is fired: It is easy to be perceived as continuous vibration<br>Scene where gun is shot sporadically: It is easy to be perceived as intermittent vibration |
| | Operation information | Long pressing time of shooting button in scene where gun is shot: It is easy to be perceived as continuous vibration<br>Short pressing time of shooting button in scene where gun is shot: It is easy to be perceived as intermittent vibration |
| | Contact state of user device and user | Strong gripping user device by user: Since vibration is unlikely to occur, it is easy to be perceived as continuous vibration<br>Weak gripping of user device by user: Since vibration is likely to occur, it is easy to be perceived as intermittent vibration |
| | Actuator state | Occurrence of overload: It is easy to be perceived as continuous vibration<br>No occurrence of overload: It is easy to be perceived as intermittent vibration |
| | Sensing result of vibration | Short interval between vibrations output from actuator: It is easy to be perceived as continuous vibration<br>Long interval between vibrations output from actuator: It is easy to be perceived as intermittent vibration |

As shown in Table 2 above, the setting unit 240 may set the operation mode based on content provided to the user in synchronization with the vibration information. Specifically, the setting unit 240 sets the first operation mode when the content indicates that the vibration output from the actuator 110 is easily perceived as the intermittent vibration. On the other hand, the setting unit 240 sets the second operation mode when the content indicates that the vibration output from the actuator 110 is easily perceived as the continuous vibration. With such a setting reference, it becomes possible to appropriately switch between the first operation mode and the second operation mode. For example, when the content is a game and the user device 100 is a game controller, the operation mode is set based on a scene of the game being played by the user, an operation of a game character, a story, and the like. An example of setting the operation mode based on the content will be described with reference to FIG. 6. FIG. 6 is a diagram for explaining an example of setting the operation mode based on the dynamic information according to the present embodiment. In the example illustrated in FIG. 6, the content is a first person shooter (FPS) game, and the user device 100 is a gun-type game controller illustrated as the user device 100A in FIG. 2. As illustrated in an upper part of FIG. 6, a scene in which a character operated by the user has a pistol is displayed on a game screen 41. Since the pistol is difficult to fire continuously and has a long shooting interval, the vibration output when the pistol is shot is easily perceived as the intermittent vibration. Therefore, the setting unit 240 sets the first operation mode and the actuator 110B outputs the vibration. On the other hand, as illustrated in a lower part of FIG. 6, a scene in which the character operated by the user has an assault rifle is displayed on a game screen 42. Since the assault rifle can fire continuously and has a short shooting interval, the vibration output when the assault rifle is shot is easily perceived as the continuous vibration.

Therefore, the setting unit 240 sets the second operation mode and the actuators 110A and 110B output vibration alternately.

As shown in Table 2 above, the setting unit 240 may set the operation mode based on the user's operation information received by the operation unit 130 for the content provided to the user in synchronization with the vibration information. Specifically, the setting unit 240 sets the first operation mode when the operation information indicates that the vibration output from the actuator 110 is easily perceived as the intermittent vibration. On the other hand, the setting unit 240 sets the second operation mode when the operation information indicates that the vibration output from the actuator 110 is easily perceived as the continuous vibration. With such a setting reference, it becomes possible to appropriately switch between the first operation mode and the second operation mode. For example, when the content is the game and the user device 100 is the game controller, the operation mode is set based on a pressing time and a pressing frequency of a button during the game play, a series of input commands, and the like. An example of setting the operation mode based on the operation information of the user will be described with reference to FIG. 7. FIG. 7 is a diagram for explaining an example of setting the operation mode based on the dynamic information according to the present embodiment. In the example illustrated in FIG. 7, the content is the FPS game, and the user device 100 is the gun-type game controller illustrated as the user device 100A in FIG. 2. As illustrated in an upper part of FIG. 7, a scene in which the character operated by the user has the assault rifle is displayed on a game screen 43. When the pressing time of the shooting button provided on the user device 100 is short, the number of bullets fired continuously decreases, so the vibration output in response to the shooting is easily perceived as the intermittent vibration. Therefore, the setting unit 240 sets the first operation mode and the actuator 110B outputs the vibration. As illustrated in a lower part of FIG. 7, a scene in which the character operated by the user has the assault rifle is displayed on a game screen 44. However, when the pressing time of the shooting button provided on the user device 100 is long, the number of bullets fired continuously is increased, so the vibration output in response to the shooting is easily perceived as the continuous vibration. Therefore, the setting unit 240 sets the second operation mode and the actuators 110A and 110B output vibration alternately.

As shown in Table 2 above, the setting unit 240 may set the operation mode based on the contact state between the user device 100 and the user. Specifically, the setting unit 240 sets the first operation mode when the contact state between the user device 100 and the user indicates that the vibration output from the actuator 110 is easily perceived as the intermittent vibration. On the other hand, the setting unit 240 sets the second operation mode when the contact state between the user device 100 and the user indicates that the vibration output from the actuator 110 is easily perceived as the continuous vibration. With such a setting reference, it becomes possible to appropriately switch between the first operation mode and the second operation mode.

As illustrated in Table 2 above, the setting unit 240 may set the operation mode based on the states of the plurality of actuators 110. Specifically, the setting unit 240 sets the first operation mode when the states of the plurality of actuators 110 indicate that the vibration output from the actuator 110 is easily perceived as the intermittent vibration. On the other hand, the setting unit 240 sets the second operation mode when the states of the plurality of actuators 110 indicate that the vibration output from the actuator 110 is easily perceived as the continuous vibration. With such a setting reference, it becomes possible to appropriately switch between the first operation mode and the second operation mode. Examples of the state of the actuator 110 may include whether or not an overload occurs, and the like. When the overload occurs, the actuator 110 has heat and the like, and is difficult to generate vibration. Therefore, when the overload occurs, the overload is easily perceived as the continuous vibration. On the other hand, when the overload does not occur, the overload is easily perceived as the intermittent vibration.

It is considered that factors causing the overload are various. For example, the overload may occur due to a long driving time of the actuator 110. The overload may occur due to a bias of a magnetic fluid position in the actuator 110 due to the presence of a strong magnetic object nearby. The overload may occur due to a change in frequency characteristics when an external pressure (for example, a grip force of a user who grips the user device 100) is strong. The overload may occur in the case where some actuators 110 are loaded when the plurality of actuators 110 vibrate due to how the user device 100 is placed on a desk. Therefore, the setting unit 240 may set the operation mode based on the presence or absence of factors causing these overloads.

As shown in Table 2 above, the setting unit 240 may set the operation mode based on the sensing result of the vibrations output from the plurality of actuators 110. Specifically, the setting unit 240 sets the first operation mode when the sensing result of the vibration indicates that the vibration output from the actuator 110 is easily perceived as the intermittent vibration. On the other hand, the setting unit 240 sets the second operation mode when the sensing result of the vibration indicates that the vibration output from the actuator 110 is easily perceived as the continuous vibration. With such a setting reference, it becomes possible to appropriately switch between the first operation mode and the second operation mode. This point wall be described in detail later.

(3) Setting Operation Mode Based on Index of Intermittency

The calculation unit 230 may calculate an index of intermittency of the output vibration based on the vibration information. The index of the vibration intermittency is an index indicating whether the intermittency of the output vibration is easily identified based on the vibration information. More specifically, the index of the intermittency is the index whether or not the user perceives the vibration as the intermittent vibration when the same actuator 110 continuously outputs each of the intermittent vibrations based on the vibration information (that is, when the first operation mode is set). The fact that the vibration intermittency is easily identified means that the user is less likely to perceive the vibration as the continuous vibration, and is highly likely to perceive the vibration as the intermittent vibration. The fact that the vibration intermittency is hard to identify means that the user is highly likely to perceive the vibration as the continuous vibration, and are less likely to perceive the vibration as the intermittent vibration. Hereinafter, such an index is also referred to as the index of the intermittency.

The setting unit 240 may set the operation mode based on the index of the intermittency. Specifically, the setting unit 240 sets the first operation mode when the index of the intermittency indicates that the intermittency of the output vibration based on the vibration information is easily identified. In other words, even if the setting unit 240 sets the first operation mode, the setting unit 240 sets the first operation mode when the user is highly likely to perceive the output vibration based on the vibration information as the intermittent vibration. Thereby, it is possible to improve the user experience, for example, by operating one actuator 110 having good performance. On the other hand, the setting unit 240 sets the second operation mode when the index indicates that the intermittency of the output vibration is difficult to identify based on the vibration information. In other words, if the setting unit 240 sets the first operation mode, the setting unit 240 sets the second operation mode when the user is highly likely to perceive the output vibration as the continuous vibration based on the vibration information. As a result, even the vibration information that is perceived by the user as the continuous vibration in the first operation mode can be perceived by the user as the intermittent vibration, and the deterioration in the user experience can be suppressed.

The information used for the index of the intermittency may be the static information shown in Table 1 above, the dynamic information shown in Table 2 above, or may include both the static information and the dynamic information. In the following, as an example, an example in which the index of the intermittency is calculated based on the static information will be described. For example, the index of the intermittency is calculated by the following Equations.

$$K = xX \times yY \quad (1)$$

$$X = b(G/W) \times H_a \quad (2)$$

$$Y = a(T_b - T_{r2}) - c \times T_a \quad (3)$$

$$G = G_h / V \times A \quad (4)$$

The information used for or related to the above Equations (1) to (4) is as shown in Table 3 below.

TABLE 3

Example of information used to calculate index of intermittency

| Category | Notation | Meaning |
|---|---|---|
| — | K | Index of intermittency |
|  | X | Components proportional to sensible acceleration |
|  | Y | Time component. Proportional, to input vibration interval $T_b$ |
|  | x, y, a, b, c | Coefficient |
| Vibration information | $T_a$ | Input vibration period (see FIG. 1) |
|  | $T_b$ | Input vibration interval (see FIG. 1) |
|  | A | Amplitude (see FIG. 1) |
|  | H | Frequency (see FIG. 1) |
| Characteristics of actuator | $T_{r2}$ | Fall time (see FIG. 5) |
|  | $G_h$ | Acceleration at frequency H (see FIG. 4) |
|  | V | Driving voltage |
| Characteristics of user device | W | Weight of user device |
| Characteristics of user | $H_a$ | Sensitivity coefficient at frequency H |

An index K of the intermittency calculated by the above Equations (1) to (4) means that the larger the value, the easier the vibration is perceived as the intermittent vibration, and the smaller the value, the easier the vibration is perceived as the continuous vibration. Therefore, the setting unit 240 sets the first operation mode when the value of the index K of the intermittency exceeds a predetermined threshold value, and sets the second operation mode when the value of the index K of the intermittency is equal to or less than the predetermined threshold value. As a result, it is possible to improve the user experience by setting the first operation mode and suppress the deterioration in the user experience by setting the second operation mode.

<3.4. Real-Time Control>

The information processing apparatus 200 controls the actuator 110 based on information acquired in real time. The information acquired in real time is the dynamic information described by taking an example in Table 2 above. In the following, as an example, the real-time control based on the sensing result of the vibration by the sensor unit 120 will be described in detail.

<3.4.1. Setting of Operation Mode>

The setting unit 240 may set the operation mode based on a sensing result of the vibrations output from the plurality of actuators 110. For example, the setting unit 240 sets the second operation mode when the interval (that is, the single output vibration interval $T_o$ described with reference to FIG. 1) of the vibration sensed during the setting period of the first operation mode is smaller than a predetermined threshold value. This is because the narrower the interval of the vibration, the more easily the vibration is perceived as the continuous vibration.

Here, the predetermined threshold value is a value of 0 or more. When the vibration is continuously output from the same actuator 110, the user perceives the vibration as the continuous vibration when the temporally adjacent vibrations overlap, so it is preferable to set the second operation mode when the single output vibration interval $T_o$ is 0 or less.

With such set criteria, a feedback control based on the actually output vibration is realized. Therefore, even if the first operation mode is set according to other set criteria such as the static information, when the actually output vibration is easily perceived as the continuous vibration, it is possible to set the second operation mode again.

Conversely, the setting unit 240 sets the first operation mode when the interval (that is, the composite output vibration interval $T_d$ described with reference to FIG. 1) of the vibration sensed when the second operation mode is set is greater than the predetermined threshold value. Here, the predetermined threshold value may be the same as or different from the predetermined threshold value for the single output vibration interval $T_o$ described above. In this case, even if the second operation mode is set according to other set criteria such as the static information, when the actually output vibration is easily perceived as the intermittent vibration, it is possible to set the first operation mode again.

<3.4.2. Edition of Vibration Information>

The editing unit 250 may rewrite the vibration information acquired by the first acquisition unit 210 when the second operation mode is set and the sensing result of the vibrations output from the plurality of actuators 110 satisfy a predetermined condition. The case where the predetermined condition is satisfied is a case where the user is highly likely to perceive the actually output vibration as the continuous vibration based on the vibration information even if the second operation mode is set. For example, the predetermined condition is that the interval (that is, the composite output vibration interval $T_d$ described with reference to FIG. 1) of the vibration sensed when the second operation mode is set is smaller than the predetermined threshold. In such a case, the editing unit 250 rewrites the vibration information so that the user is highly likely to perceive the vibration as the intermittent vibration.

Here, the predetermined threshold value is a negative value. That is, when the plurality of actuators 110 share and output vibration, even when the temporally adjacent vibrations overlap, the user perceives the vibration as the intermittent vibration. This is in contrast to the case where when the first operation mode is set and the same actuator 110 continuously outputs the vibration, if the temporally adjacent vibrations overlap, the user perceives the vibration as the continuous vibration.

As the rewriting of the vibration information, at least one of the interval, period, intensity (amplitude and/or voltage value) or frequency of the vibration is changed. Specifically, the interval of the vibration may extend, the period of the vibration may be shortened, the intensity of the vibration may be increased, or the frequency of the vibration may be changed according to the sensitivity characteristics of the user. By such rewriting, the possibility that the user perceives the vibration as the intermittent vibration can be improved.

Figure 8:
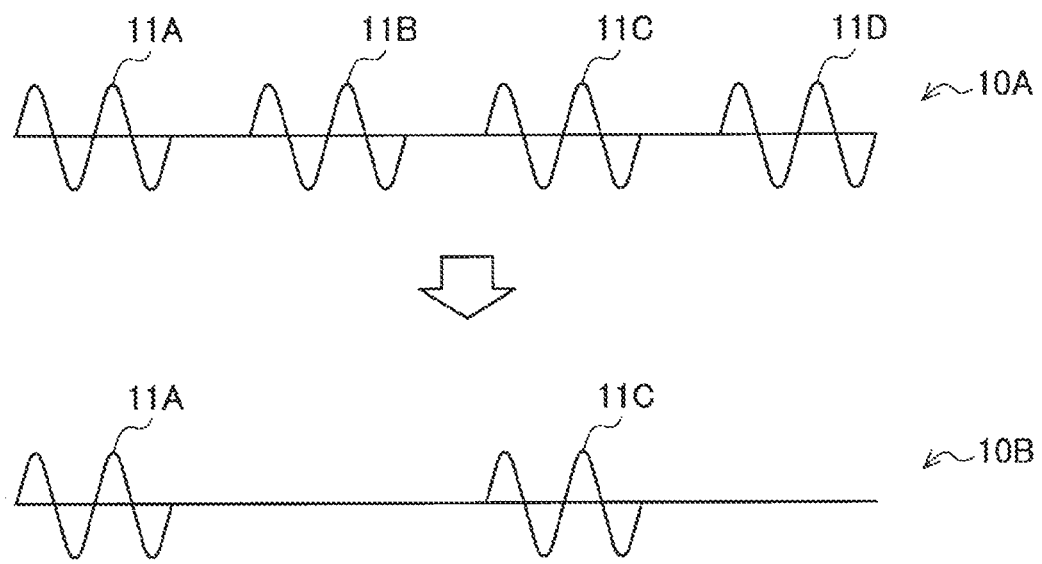
FIG. 8 is a diagram for explaining an example of rewriting vibration information according to the present embodiment.

In addition, as illustrated in FIG. 8, the vibration may be thinned out as the rewriting of the vibration information. FIG. 8 is a diagram for explaining an example of rewriting the vibration information according to the present embodiment. For waveforms of vibration information 10A and 10B illustrated in FIG. 8, a horizontal axis indicates time, the time flows from left to right, a vertical axis indicates amplitude, and the greater the distance from the horizontal axis, the greater the amplitude. The vibration information 10A is the vibration information acquired by the first acquisition unit 210, and the vibration information 10B is the vibration information after the rewriting by the editing unit 250. As illustrated in FIG. 8, among vibrations 11A to 11D included in the vibration information 10A, the vibrations 11B and 11D are thinned out, and the vibration information 10B includes the vibrations 11A and 11C. As a result, at least the interval of the vibration becomes long, which makes it possible to improve the possibility that the vibration will be perceived by the user as the intermittent vibration.

<3.5. Selection of Actuator to be Operated>

(1) Selection Criteria

The setting unit 240 selects, from the plurality of actuators 110, one or more actuators 110 that output the vibration based on the vibration information. It is considered that the selection criteria are various. An example will be described below.

Characteristics of Actuator 110

The setting unit 240 may select the actuator 110 to be operated based on the characteristics of the actuator 110. For example, the setting unit 240 preferentially selects a specific actuator 110 having relatively good performance. As a result, it is possible to improve the user experience.

Content

Figure 9:
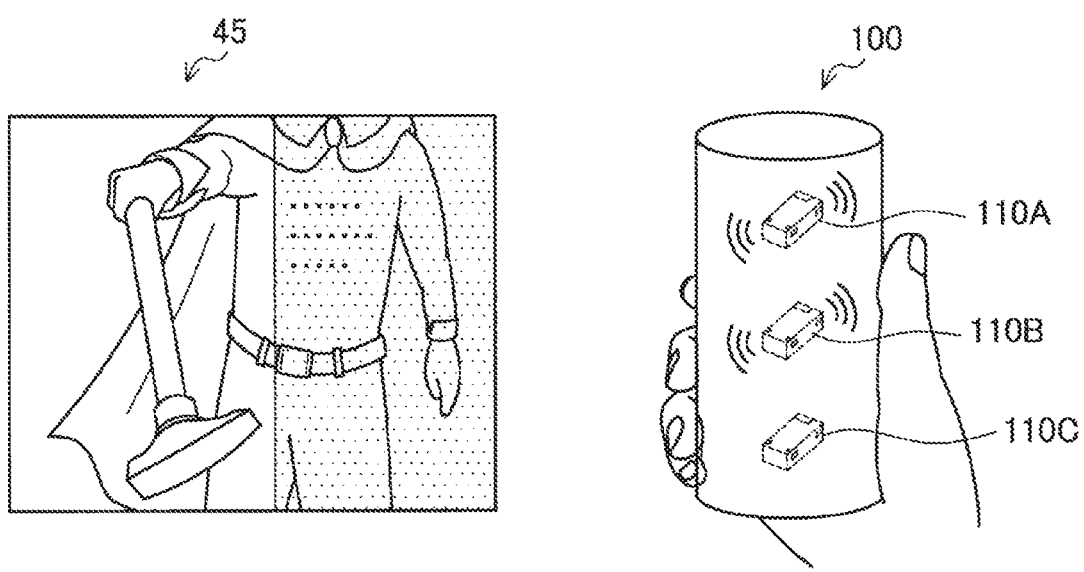
FIG. 9 is a diagram for explaining an example of selecting the actuator according to the present embodiment.

The setting unit 240 may select the actuator 110 to be operated based on the content provided to the user in synchronization with the vibration information. For example, the setting unit 240 selects the actuator 110 provided at a position corresponding to a vibration generation source in the content. An example thereof will be described with reference to FIG. 9. FIG. 9 is a diagram for explaining an example of selecting the actuator 110 according to the present embodiment. In the example illustrated in FIG. 9, the content is a game, and the user device 100 is the bar-shaped game controller illustrated as the user device 100C in FIG. 2. A scene in which a character operated by the user possesses a hammer-type weapon is displayed on a game screen 45. The hammer is configured to include a handle gripped by a person and a head that is heavier than the handle and is struck on an object to be hit, in which the head becomes a vibration generation source at the time of hitting. Therefore, the setting unit 240 selects the actuators 110A and 110B provided at an upper portion of the user device 100 as the actuators 110 corresponding to the head of the hammer. As a result, the user gripping a lower portion of the user device 100 is provided with vibration having the upper portion of the user device 100 as the vibration generation source as if the user is actually hit an object with the hammer. Therefore, it is possible to improve the user experience by improving an immersive feeling of the content.

Contact State

Figure 10:
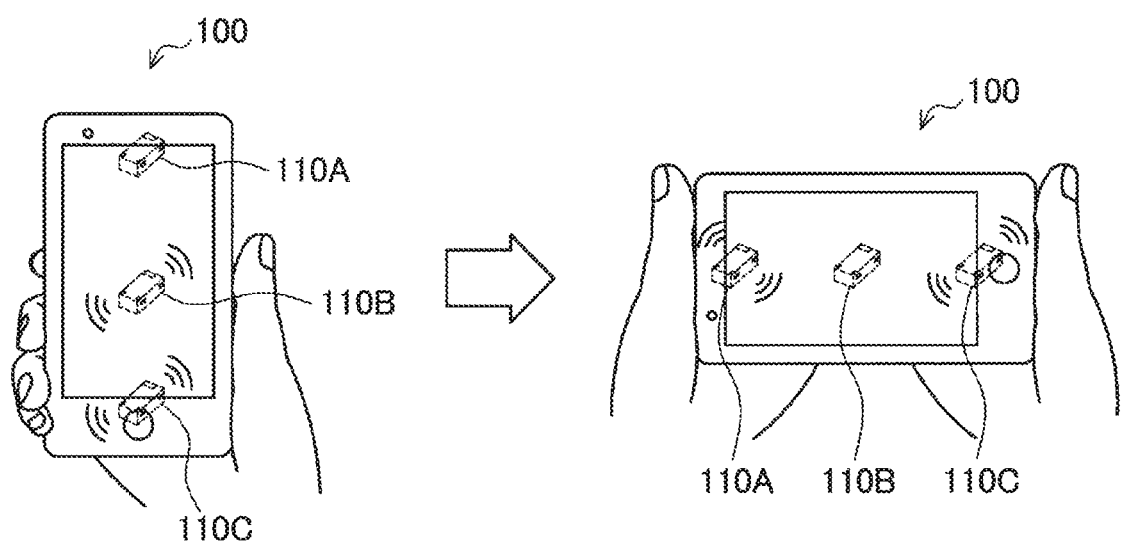
FIG. 10 is a diagram for explaining another example of selecting the actuator according to the present embodiment.

The setting unit 240 may select the actuator 110 to be operated based on the contact state between the user device 100 and the user. For example, the setting unit 240 selects the actuator 110 provided at a position (for example, a position near a palm) where the user who operates the user device 100 easily perceives vibration. An example thereof will be described with reference to FIG. 10. FIG. 10 is a diagram for explaining an example of selecting the actuator 110 according to the present embodiment. In the example illustrated in FIG. 10, the user device 100 is a smartphone illustrated as the user device 100D in FIG. 2. As illustrated in the left side of FIG. 10, when the user grips a lower portion of the user device 100 vertically in a longitudinal direction of the user device 100, the setting unit 240 selects the actuators 110B and 110C provided at the portion gripped by the user. On the other hand, as illustrated in the right side of FIG. 10, when the user grips the lower portion of the user device 100 horizontally in the longitudinal direction of the user device 100, the setting unit 240 selects the actuators 110A and 110C provided at the portion gripped by the user. As a result, the user easily perceives the vibration, and as a result, it is possible to improve the user experience.

State of User Device 100

The setting unit 240 may select the actuator 110 to be operated based on a state of the user device 100. For example, when a shape of the user device 100 is changed, the setting unit 240 selects the actuator 110 provided at a position (for example, a position near a palm) where the user who operates the changed user device 100 easily perceives vibration. An example thereof will be described with reference to FIG. 11. FIG. 11 is a diagram for explaining an example of selecting the actuator 110 according to the present embodiment. In the example illustrated in FIG. 11, the user device 100 includes a main body 107 having a display, operation units 130A and 130B such as buttons, and operating bodies 108A and 108B detachably provided to the main body 107. In the example illustrated in the left side of FIG. 11, the operating bodies 108A and 108B are grips both the operating bodies 108A and 108B. attached to the main body 107, and the user Therefore, the setting unit 240 selects the actuators 110B and 110D provided at the portion gripped by the user. On the other hand, in the example illustrated in the right side of FIG. 11, the operating bodies 108A and 108B are removed from the main body 107, and the user grips only the operating body 108A to operate the operation unit 130A. Therefore, the setting unit 240 selects the actuators 110A and 110B provided at the portion gripped by the user. Therefore, even when the state of the user device 100 is changed, the vibration can be stably output to the user.

(2) Coping with Overload

When the actuator 110 that outputs the vibration based on the vibration information is overloaded or can be overloaded, it is preferable that another actuator 110 outputs the vibration instead of the actuator 110. This is because it is dangerous to continuously use the actuator 110 that is overloaded or can be overloaded in order to suppress the deterioration in the user experience. In addition, if the same actuator 110 is used continuously, the actuator 110 may generate heat and may have the increasing resistance, resulting in an increase in power consumption, However, the alternative actuator 110 outputs vibration, which results in secondarily obtaining the effect of reducing the overall power consumption. However, since the characteristics of each of the plurality of actuators 110 included in the user device 100 may be different, it is preferable to take appropriate measures.

Therefore, the setting unit 240 selects, based on the state and characteristics of the plurality of actuators 110, one or more actuators 110 that output the vibration based on the vibration information. The setting unit 240 may select the actuator 110 that prevents the overload. In that case, the setting unit 240 selects, based on the first actuator 110 that can be overloaded, one or more second actuators 110 having characteristics satisfying a predetermined condition, instead of the first actuator 110. As a result, it is possible to prevent the overload. On the other hand, the setting unit 240 may select the actuator 110 after the overload occurs. In this case, the setting unit 240 selects, based on the characteristics of the first actuator 110 that is overloaded, one or more second actuators 110 having characteristics satisfying the predetermined condition, instead of the first actuator 110. Thereby, it is possible to stop the use of the overloaded actuator 110 to avoid danger, and suppress the deterioration in the user experience by using another actuator 110 instead of the first actuator 110.

The above-mentioned predetermined condition may be, for example, that the second actuator 110 has characteristics equivalent, to those of the first actuator 110. In addition, the predetermined condition is that vibration intensity that can be output from the first actuator 110 can be output from one second actuator 110 or a total of a plurality of second actuators 110. Further, the predetermined condition may be that the second actuator 110 has a reserve force (for example, there is a margin up to the maximum vibration intensity that can be output).

The above described aspects will be described below in detail with reference to FIGS. 12 and 13.

Figure 12:
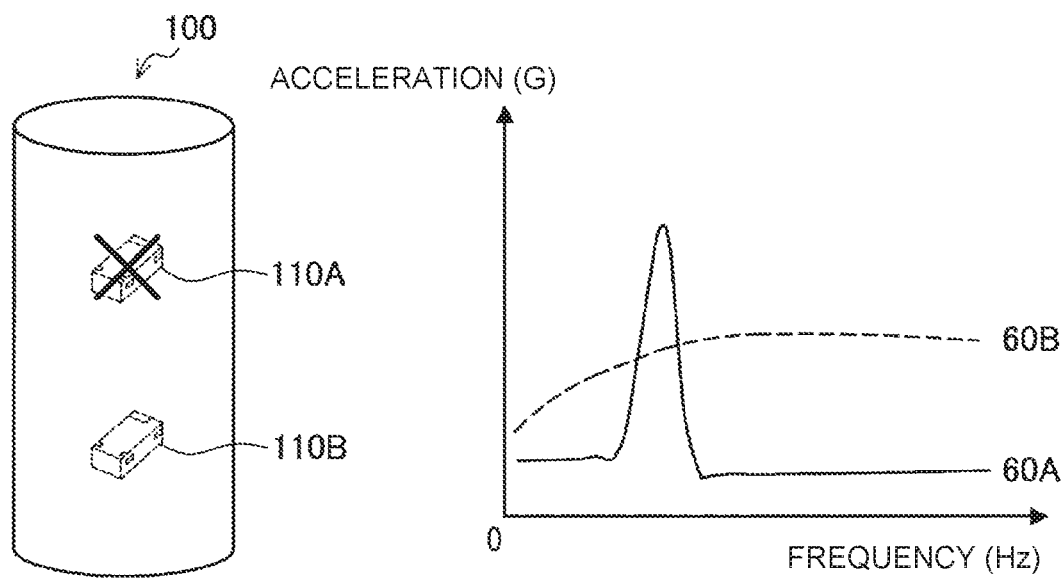
FIG. 12 is a diagram for explaining an example of coping with an overload according to the present embodiment.

FIG. 12 is a diagram for explaining an example of coping with an overload according to the present embodiment. As illustrated in the left side of FIG. 12, the user device 100 includes the actuators 110A and 110B. The actuator 110A can output a vibration of 60 Hz up to 4 Gpp. As illustrated in the right side of FIG. 12, a frequency-acceleration characteristic 60A of the actuator 110A shows a high characteristic at 60 Hz, and the other shows a low characteristic. The actuator 110B can output a vibration of 60 Hz up to 2 Gpp. As illustrated in the right side of FIG. 12, a frequency-acceleration characteristic 60B of the actuator 110B shows a characteristic that become lower as the frequency becomes lower, and shows a characteristic that becomes higher as the frequency becomes higher. For example, the actuator 110A is mainly in charge of a low frequency of about 60 Hz, and outputs vibration of the gun in the FPS game. In addition, the actuator 110B is mainly in charge of a high frequency of about 200 Hz, and outputs the vibration of the gun in the FPS game.

It is assumed that the actuator 110A is overloaded. In this case, the setting unit 240 selects the actuator 110B as the actuator 110 that outputs the vibration of 60 Hz that the actuator 110A is in charge of, instead of the actuator 110A. Therefore, the actuator 110B is in charge of a low frequency of about 60 Hz, and outputs the vibration of the gun in the FPS game, for example.

Figure 13:
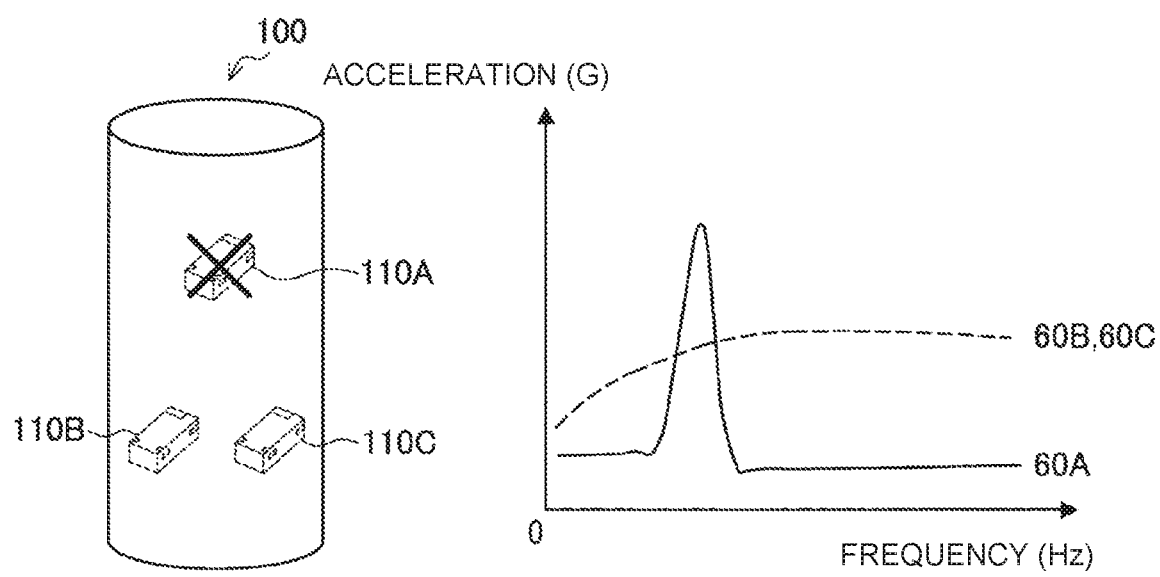
FIG. 13 is a diagram for explaining another example of coping with an overload according to the present embodiment.

FIG. 13 is a diagram for explaining an example of coping with an overload according to the present embodiment. As illustrated in the left side of FIG. 13, the user device 100 includes the actuators 110A, 110B, and 110C. The actuator 110A can output a vibration of 60 Hz up to 4 Gpp. As illustrated in the right side of FIG. 12, a frequency-acceleration characteristic 60A of the actuator 110A shows a high characteristic at 60 Hz, and the other shows a low characteristic. The actuators 110B and 110C can output a vibration of 60 Hz up to 2 Gpp. As illustrated in the right side of FIG. 12, frequency-acceleration characteristics 60B and 60C of the actuators 110B and 110C show a characteristic that becomes lower as the frequency becomes lower, and show a characteristic that becomes higher as the frequency becomes higher. For example, the actuator 110A is mainly in charge of a low frequency of about 60 Hz, and outputs vibration of the gun in the FPS game. In addition, the actuator 110B is mainly in charge of a high frequency of about 200 Hz, and outputs the vibration of the gun in the FPS game.

It is assumed that the actuator 110A is overloaded. In this case, the setting unit 240 selects the actuators 110B and 110C as the actuator 110 that outputs the vibration of 60 Hz that the actuator 110A is in charge of, instead of the actuator 110A. Therefore, the actuators 110B and 110C are also in charge of a low frequency of about 60 Hz, and outputs the vibration of the gun in the FPS game, for example. Each of the actuators 110B and 110C can output a maximum of 2 Gpp at 60 Hz, and as result, a maximum of 4 Gpp can be output in total, and the actuator 110A can be covered from the viewpoint of the intensity of the vibration.

<3.6. Flow of Process>

Figure 14:
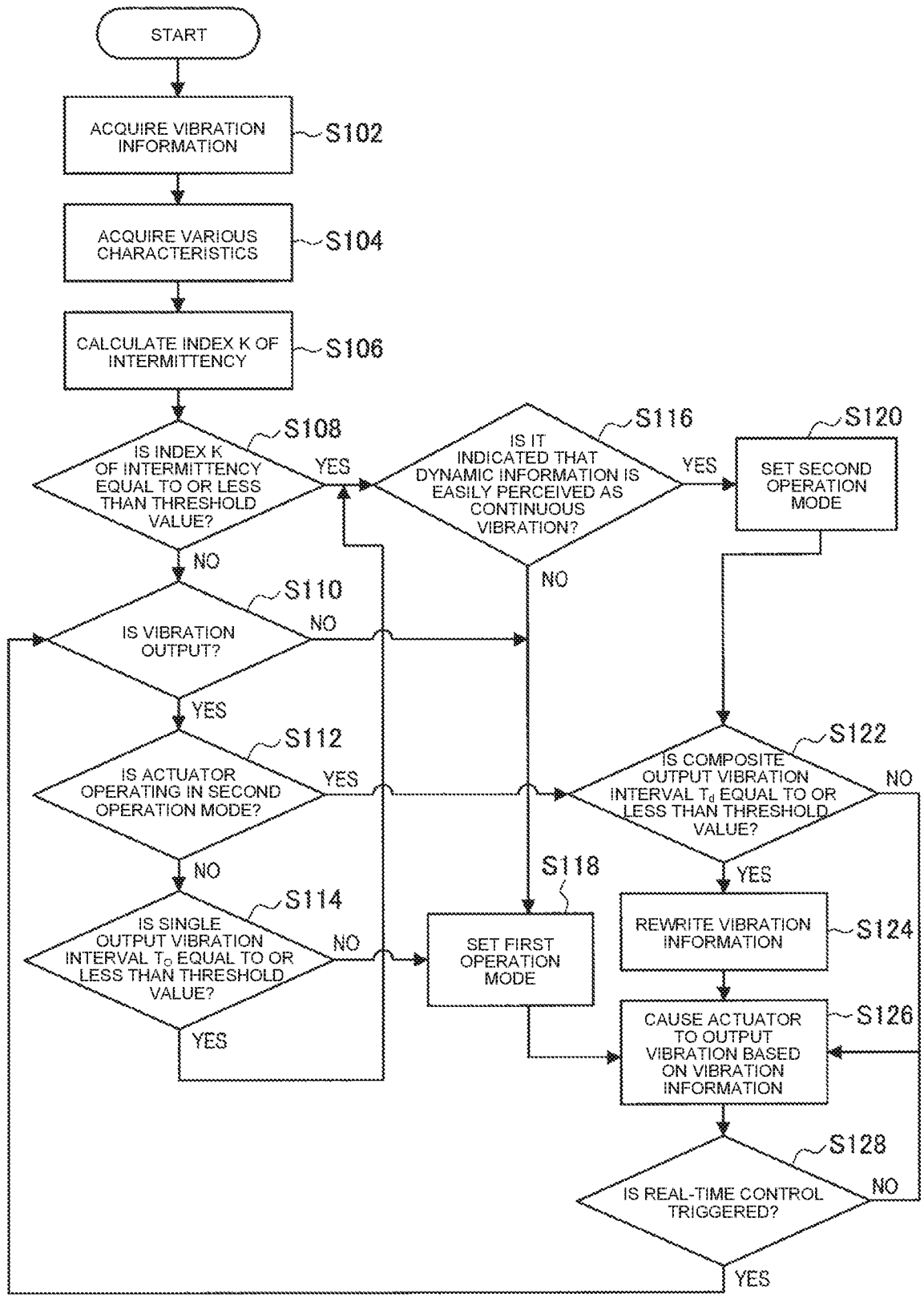
FIG. 14 is a flowchart illustrating an example of a flow of a vibration output control process executed by an information processing apparatus according to the present embodiment.

Hereinafter, an example of the flow of the above-described various processes will be described with reference to FIG. 14. FIG. 14 is a flowchart illustrating an example of a flow of vibration output control process executed by the information processing apparatus 200 according to the present embodiment. In this flow, it is assumed that the content provided to the user is the game, and the vibration information is provided in synchronization with the game. This flow is executed during the play before the start of the game.

As illustrated in FIG. 14, first, the first acquisition unit 210 acquires the vibration information (Step S102). This step can be executed at the time of the start of the game and when a game title is changed.

Next, the second acquisition unit 220 acquires, as an example, various characteristics of the user shown in Table 1 such as the characteristics of the actuator 110, the characteristics of the user device 100 (Step S104). This step can be executed at the start of the game or when the user device 100 is connected.

Next, the calculation unit 230 calculates the index K of the intermittency based on the vibration information and these various characteristics (Step S106).

Next, the setting unit 240 determines whether the calculated index K of the intermittency is equal to or less than the predetermined threshold value (Step S108). If it is determined that the index K is equal to or less than the threshold value (Step S108/YES), the process proceeds to Step S116. If it is determined that the index K is equal to or less than the threshold value (Step S108/NO), the process proceeds to Step S110.

In Step S110, the setting unit 240 determines whether or not the vibration is output from the actuator 110 based on the vibration sensing result by the sensor unit 120. If it is determined that the vibration is output (Step S110/YES), the process proceeds to Step S112. If it is determined that the vibration is not output (Step S110/NO), the process proceeds to Step S118.

In Step S112, the setting unit 240 determines whether the actuator 110 is operating in the second operation mode. If it is determined that the actuator 110 is operating in the second operation mode (Step S112/YES), the process proceeds to Step S122. If it is determined that the actuator 110 is not operating in the second operation mode (Step S112/NO), the process proceeds to Step S114.

In Step S114, the setting unit 240 determines whether the single output vibration interval $T_o$ is equal to or less than the threshold value (Step S114). If it is determined that the single output vibration interval $T_o$ is equal to or less than the threshold value (Step S114/YES), the process proceeds to Step S116. If it is determined that the single output vibration interval $T_o$ is not equal to or less than the threshold value (Step S114/NO), the process proceeds to Step S118.

In Step S116, the setting unit 240 determines whether the dynamic information indicates that the vibration output from the actuator 110 is easily perceived as the continuous vibration. When it is determined that the vibration is easily perceived as the continuous vibration. (Step S116/YES), the process proceeds to Step S120, When it is determined that the vibration is easily perceived as the intermittent vibration (Step S116/NO), the process proceeds to Step S118.

In Step S118, the setting unit 240 sets the first operation mode. Furthermore, the setting unit 240 may select the actuator 110 to be operated. Then, the process proceeds to Step S126.

In Step S120, the setting unit 240 sets the second operation mode. Furthermore, the setting unit 240 may select the actuator 110 to be operated. Then, the process proceeds to Step S122.

In Step S122, the editing unit 250 determines whether the composite output vibration interval $T_d$ is equal to or less than the threshold value. If it is determined that the composite output vibration interval $T_d$ is equal to or less than the threshold value (Step S122/YES), the processing proceeds to Step S124. If it is determined that the composite output vibration interval $T_d$ is not equal to or less than the threshold value (Step S122/NO), the process proceeds to Step S126.

In Step S124, the editing unit 250 rewrites the vibration information. For example, the editing unit 250 edits the vibration information to extend the interval of the vibration, shorten the period of the vibration, increase the intensity of the vibration, or change the frequency of the vibration according to the sensitivity characteristic of the user.

In Step S126, the output control unit 260 causes the actuator 110 to output the vibration based on the vibration information according to the set operation mode (Step S126). Here, the vibration information is the vibration information after the rewriting when Step S124 is executed.

In Step S128, the setting unit 240 determines whether the real-time control is triggered. For example, when there is a change in the static information or the dynamic information, it is determined that the real-time control is triggered. If it is determined that the real-time control is triggered (Step S128/YES), the process returns to Step S110. If it is determined that the real-time control is not triggered (Step S128/NO), the process returns to Step S126.

The example of the flow of the vibration output control process has been described above. Note that it is determined in Step S128 that the real-time control is triggered (Step S128/YES), the process may return to Step S106.

<<4. Example of Hardware Configuration>>

Figure 15:
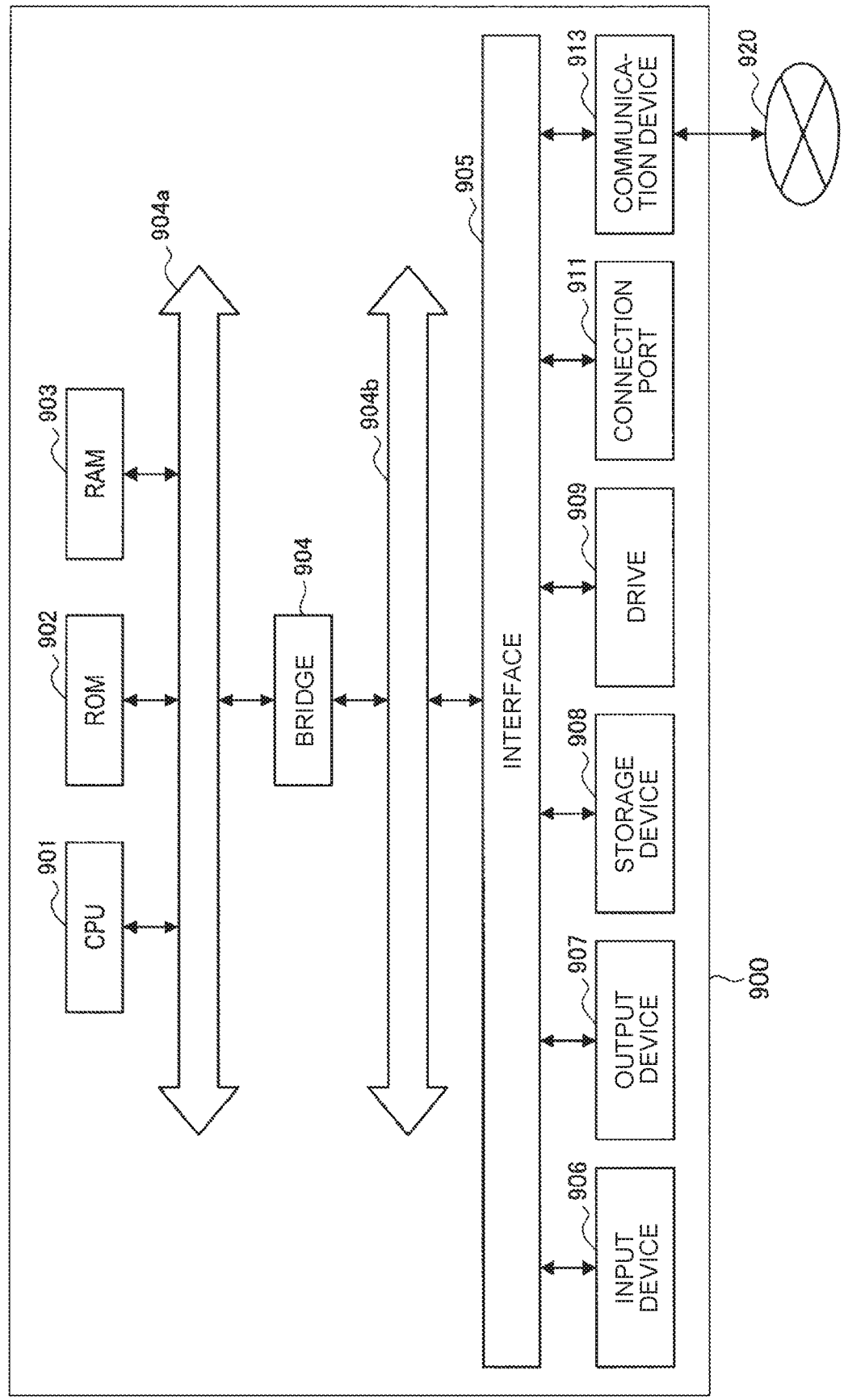
FIG. 15 is a block diagram illustrating an example of a hardware configuration of the information processing apparatus according to the present embodiment.

Finally, a hardware configuration of the information processing apparatus according to the present embodiment will be described with reference to FIG. 15. FIG. 15 is a block diagram illustrating an example of a hardware configuration of the information processing apparatus according to the present embodiment. An information processing apparatus 900 illustrated in FIG. 15 can realize the user device 100 or the information processing apparatus 200 illustrated in FIG. 3, for example. The information processing by the user device 100 or the information processing apparatus 200 according to the present embodiment is implemented by cooperation of software and hardware described below.

As illustrated in FIG. 15, the information processing apparatus 900 includes a central processing unit (CPU)) 901, a read only memory (ROM) 902, a random access memory (RAM) 903, and a host bus 904a. In addition, the information processing apparatus 900 includes a bridge 904, an external bus 904b, an interface 905, an input device 906, an output device 907, a storage device 908, a drive 909, a connection port 911, and a communication device 913. The information processing apparatus 900 may have a processing circuit such as an electric circuit, a DSP, or an ASIC, instead of or in addition to the CPU 901.

The CPU 901 functions as an arithmetic processing device and a control device, and controls the overall operation of the information processing apparatus 900 according to various programs. In addition, the CPU 901 may be a microprocessor. The ROM 902 stores programs, operation parameters, or the like used by the CPU 901. The RAM 903 temporarily stores programs used in the execution of the CPU 901, parameters that are changed appropriately in the execution, and the like. The CPU 901 may form, for example, the first acquisition unit 210, the second acquisition unit 220, the calculation unit 230, the setting unit 240, the editing unit 250, and the output control unit 260 illustrated in. FIG. 3.

The CPU 901, the ROM 902, and the RAM 903 are connected to each other by the host bus 904a including a CPU bus and the like. The host bus 904a as connected to the external bus 904b such as a peripheral component interconnect/interface (PCI) bus via the bridge 904. Note that the host bus 904a, the bridge 904, and the external bus 904b do not necessarily have to be separately configured, and these functions may be mounted on one bus.

The input device 906 is implemented by a device, such as a mouse, a keyboard, a touch panel, a button, a microphone, a switch, and a lever, to which information is input by the user. Further, the input device 906 may be, for example, a remote control device using infrared rays or other radio waves, or may be an externally connected device such as a mobile phone or PDA that responds to the operation of the information processing apparatus 900. Furthermore, the input device 906 may include, for example, an input control circuit or the like that generates an input signal based on the information input by the user using the above-described input means aria outputs the input signal to the CPU 901. The user of the information processing apparatus 900 can operate the input device 906 to input various data to the information processing apparatus 900 or give an instruction on processing operations. The device to which the information is input by the user described above may form the operation unit 130 illustrated in FIG. 3, for example.

In addition, the input device 906 may be formed by a device that detects information on the user. For example, the input device 906 may include various sensors such as an image sensor (for example, a camera), a depth sensor (for example, a stereo camera), an acceleration sensor, a gyro sensor, a geomagnetic sensor, an optical sensor, a sound sensor, a ranging sensor, or a force sensor.

In addition, the input device 906 may obtain information on the state of the information processing apparatus 900 itself, such as a posture and a moving speed of the information processing apparatus 900, or information on the surrounding environment of the information processing apparatus 900, such as brightness and noise around the information processing apparatus 900. Further, the input device 906 may include a global navigation satellite system (GNSS) module that receives a GNSS signal (for example, a global positioning system (GPS) signal from a GPS satellite) from a GNSS satellite to measure position information including a latitude, a longitude, and an altitude of the device. In addition, regarding the position information, the input device 906 may detect the position by transmission/reception with Wi-Fi (registered trademark), a mobile phone/PHS/smartphone, and the like, or by short-range communication and the like. The device that detects the information on the user described above may form the sensor unit 120 illustrated in FIG. 3, for example.

The output device 907 is formed of a device capable of visually or aurally notifying the user of the acquired information. Such devices include display devices such as a CRT display device, a liquid crystal display device, a plasma display device, an EL display device, a laser projector, an LED projector, and a lamp, audio output devices such as a speaker and a headphone, a printer device, or the like. The output device 907 outputs results obtained by various processes performed by the information processing apparatus 900, for example. Specifically, the display device visually displays the results obtained by various processes performed by the information processing apparatus 900 in various formats such as a text, an image, a table, and a graph. On the other hand, the audio output device converts an audio signal composed of reproduced audio data, acoustic data, and the like into an analog signal and aurally outputs the analog signal.

In addition, the output device 907 is formed of a device capable of tactilely notifying the user of the acquired information. Such devices include an eccentric motor, LRA, VCM, and the like. The output device 907 may form, for example, the actuator 110 illustrated in FIG. 3.

The storage device 908 is a device for storing data formed as an example of a storage unit of the information processing apparatus 900. For example, the storage device 908 is implemented by a magnetic storage device such as an HDD, a semiconductor storage device, an optical storage device, a magneto-optical storage device, or the like. The storage device 908 may include a storage medium, a recording device that records data in the storage medium, a reading device that reads data from the storage medium, a deletion device that deletes the data recorded in the storage medium, and the like. The storage device 908 stores programs executed by the CPU 901, various data, various data acquired from the outside, and the like. The storage device 908 may form, for example, the storage unit 140 illustrated in FIG. 3.

The drive 909 is a reader/writer for the storage medium, and is built in or externally attached to the information processing apparatus 900. The drive 909 reads information recorded in a removable storage medium such as a mounted magnetic disk, an optical disk, a magneto-optical disk, or a semiconductor memory, and outputs the read information to the RAM 903. In addition, the drive 909 can also write information in the removable storage medium.

The connection port 911 is an interface connected to an external device, and is a connection port with an external device capable of transmitting data by, for example, a universal serial bus (USB) and the like.

The communication device 913 is, for example, a communication interface formed of a communication device or the like for connecting to a network 920. The communication device 913 is, for example, a communication card or the like for wired or wireless local area network (LAN), long term evolution (LTE), Bluetooth (registered trademark), or wireless USB (WUSB). In addition, the communication device 913 may be a router for optical communication, a router for asymmetric digital subscriber line (ADSL), a modem for various kinds of communication, or the like. The communication device 913 can transmit and receive signals and the like to and from, for example, the Internet and other communication devices according to a predetermined protocol such as TCP/IP. In the present embodiment, for example, each of the user device 100 and the information processing apparatus 200 may have the communication device 913, and may transmit/receive information to/from each other via the communication device 913.

Note that the network 920 is a wired or wireless transmission path of information transmitted from a device connected to the network 920. For example, the network 920 may include a public line network such as the Internet, a telephone line network, and a satellite communication network, various local area networks (LANs) including Ethernet (registered trademark), a wide area network (WAN), and the like. In addition, the network 920 may include a dedicated line network such as an internet protocol-virtual private network (IP-VPN).

Heretofore, an example of the hardware configuration capable of implementing the functions of the information processing apparatus 900 according to the present embodiment has been shown. Each of the above components may be implemented by using a general-purpose member, or may be implemented by hardware specialized for the functions of each component. Therefore, it is possible to appropriately change the hardware configuration to be used according to the technical level at the time of implementing the present embodiment.

Note that it is possible to create computer programs for implementing each function of the information processing apparatus 900 according to the present embodiment as described above, and mount the computer programs on a PC or the like. In addition, i is also possible to provide a computer-readable recording medium in which such a computer program is stored. The recording medium is, for example, a magnetic disk, an optical disk, a magneto-optical disk, a flash memory, or the like. Further, the above computer program may be distributed, for example, via a network without using the recording medium.

<<5. Summary>>

The embodiment of the present disclosure has been described above in detail with reference to FIGS. 1 to 15. As described above, the information processing apparatus 200 according to the present embodiment acquires the vibration information for outputting the intermittent vibration to the actuator 110, and sets the operation mode of the plurality of actuators 110 capable of outputting the vibration to the same user based on the vibration information. Specifically, the information processing apparatus 200 is set in the first operation mode in which the same actuator 110 continuously outputs each of the intermittent vibrations based on the vibration information, or the second operation mode in which the plurality of actuators 110 share the intermittent vibrations while the same actuator 110 discontinuously outputs each of the intermittent vibrations based on the vibration information According to the first operation mode, the deterioration in the user experience can be suppressed as long as the vibration 20 is perceived by the user as the intermittent vibration. According to the second operation mode, even the vibration information that is perceived by the user as the continuous vibration in the first operation mode can be perceived by the user as the intermittent vibration, and the deterioration in the user experience can be suppressed. In this way, the deterioration in the user experience accompanied by feedback due to the vibration is suppressed.

Hereinabove, the preferred embodiments of the present disclosure have been described in detail with reference to the accompanying drawings, but the technical scope of the present disclosure is not limited to such examples. It will be apparent to those skilled in the art of the present disclosure that various changes or modifications can be conceived within the scope of the technical idea described in the claims, and it is naturally understood that these changes or modifications fall within the technical scope of the present disclosure.

The information processing apparatus 200 can be implemented in various ways. For example, when the user device 100 is a game controller, the information processing apparatus 200 may be implemented as hardware such as a processor or circuit of a game machine or software such as an operating system (OS). Further, the information processing apparatus 200 may be implemented as a part of game software. Further, the information processing apparatus 200 may be included in the user device 100 and integrally configured.

Although the information processing apparatus 200 has been described above as setting the operation mode based on the static information and the dynamic information, the present technology is not limited to such an example. The entity that sets the operation mode based on the static information and the entity that sets the operation mode based on the dynamic information may be different. For example, the first information processing apparatus used when producing content such as a game may set the operation mode based on the static information and the second information processing apparatus used when reproducing the content or the content may set the operation mode based on the dynamic information. In this case, the first information processing apparatus sets the operation mode in advance based on the user device 100 and the actuator 110, which are assumed to be used at the time of producing content, and each characteristic of the vibration information provided in synchronization with the content. Then, the second information processing apparatus controls the actuator 110 in the operation mode set in advance while reproducing the content, and changes the operation mode according to the dynamic information.

Further, the process described in the present specification using the flowchart and the sequence diagram does not necessarily have to be executed in the illustrated order. Some processing steps may be performed in parallel. Further, additional processing steps may be adopted, and some processing steps may be omitted.

In addition, the effects described in the present specification are merely illustrative or exemplary, and are not limited to those described in the present specification. That is, the technology according to the present disclosure can exhibit other effects apparent to those skilled in the art from the description of the present specification, in addition to or instead of the effects described above.

The following configurations are also within the technical scope of the present disclosure.

(1)

An information processing apparatus, comprising:
an acquisition unit that acquires vibration information for outputting intermittent vibration to an actuator; and
a setting unit that sets an operation mode of a plurality of actuators capable of outputting vibration to the same user based on the vibration information as a first operation mode in which the same actuator continuously outputs each intermittent vibration based on the vibration information or as a second operation mode in which the plurality of actuators share the intermittent vibrations while the same actuator discontinuously outputs each of the intermittent vibrations based on the vibration information.

(2)

The information processing apparatus according to (1), wherein the setting unit sets the operation mode based on characteristics of the vibration information.

(3)

The information processing apparatus according to (1) to (2), wherein the setting unit sets the operation mode based on characteristics of each of the plurality of actuators.

(4)

The information processing apparatus according to any one of (1) to (3), wherein the setting unit sets the operation mode based on characteristics of a device in which the plurality of actuators are provided.

(5)

The information processing apparatus according to any one of (1) to (4), wherein the setting unit sets the operation mode based on content provided to the user in synchronization with the vibration information.

(6)

The information processing apparatus according to any one of (1) to (5), wherein the setting unit sets the operation mode based on operation information of the user for content provided to the user in synchronization with the vibration information.

(7)

The information processing apparatus according to any one of (1) to (6), wherein the setting unit sets the operation mode based on a contact state of a device in which the plurality of actuators are provided and the user.

(8)

The information processing apparatus according to any one of (1) to (7), wherein the setting unit sets the operation mode based on states of the plurality of actuators.

(9)

The information processing apparatus according to any one of (1) to (8), wherein the setting unit sets the operation mode based on a sensing result of the vibrations output from the plurality of actuators.

(10)

The information processing apparatus according to any one of (1) to (9), further comprising:
a calculation unit that calculates an index of intermittency of output vibration based on the vibration information,
wherein the setting unit sets the operation mode based on the index.

(11)

The information processing apparatus according to (10), wherein the setting unit sets the first operation mode when the index indicates that the intermittency of the output vibration is easily identified based on the vibration information, and sets the second operation mode when the index indicates that the intermittency of the output vibration is difficult to identify based on the vibration information.

(12)

The information processing apparatus according to any one of (1) to (11), further comprising:

an editing unit that rewrites the vibration information when the second operation mode is set and a sensing result of vibrations output from the plurality of actuators satisfies a predetermined condition.

(13)

The information processing apparatus according to any one of (1) to (12), wherein the setting unit selects, from the plurality of actuators, one or more actuators that output the vibration, based on the vibration information.

(14)

The information processing apparatus according to (13), wherein the setting unit selects one or more actuators, which output the vibration based on the vibration information, based on at least any of content provided to the user in synchronization with the vibration information, a contact state of a device in which the plurality of actuators are provided and the user, or a state of the device.

(15)

The information processing apparatus according to (14), wherein the setting unit selects one or more actuators which output the vibration based on the vibration information, based on states and characteristics of the plurality of actuators.

(16)

The information processing apparatus according to (15), wherein the setting unit selects one or more second actuators having characteristics satisfying a predetermined condition instead of an overloaded first actuator based on characteristics of the first actuator.

(17)

An information processing method, comprising:

acquiring vibration information for outputting intermittent vibration to an actuator; and setting, by a processor, an operation mode of a plurality of actuators capable of outputting vibration to the same user based on the vibration information as a first operation mode in which the same actuator continuously outputs each intermittent vibration based on the vibration information or as a second operation mode in which the plurality of actuators share the intermittent vibrations while the same actuator discontinuously outputs each of the intermittent vibrations based on the vibration information.

(18)

A recording medium recorded with a program for causing a computer to function as:

an acquisition unit that acquires vibration information for outputting intermittent vibration to an actuator; and a setting unit that sets an operation mode of a plurality of actuators capable of outputting vibration to the same user based on the vibration information as a first operation mode in which the same actuator continuously outputs each of the intermittent vibrations based on the vibration information or as a second operation mode in which the plurality of actuators share the intermittent vibrations while the same actuator discontinuously outputs each of the intermittent vibrations based on the vibration information.

REFERENCE SIGNS LIST

1 INFORMATION PROCESSING SYSTEM
100 USER DEVICE
110 ACTUATOR
120 SENSOR UNIT
130 OPERATION UNIT
140 STORAGE UNIT
200 INFORMATION PROCESSING APPARATUS
210 FIRST ACQUISITION UNIT
220 SECOND ACQUISITION UNIT
230 CALCULATION UNIT
240 SETTING UNIT
250 EDITING UNIT
260 OUTPUT CONTROL UNIT

The invention claimed is:

1. An information processing apparatus, comprising:

an acquisition unit configured to acquire vibration information for outputting intermittent vibration to an actuator;

a setting unit configured to set an operation mode of a plurality of actuators that output vibration to a same user based on the vibration information as a first operation mode in which a same actuator continuously outputs each intermittent vibration based on the vibration information or as a second operation mode in which the plurality of actuators share the intermittent vibrations while the same actuator discontinuously outputs each of the intermittent vibrations based on the vibration information; and a calculation unit that calculates an index of intermittency of output vibration based on the vibration information, wherein the setting unit sets the operation mode based on the index, and wherein the acquisition unit, the setting unit, and the calculation unit are each implemented via at least one processor.

2. The information processing apparatus according to claim 1, wherein the setting unit is further configured to set the operation mode based on characteristics of the vibration information.

3. The information processing apparatus according to claim 1, wherein the setting unit is further configured to set the operation mode based on characteristics of each of the plurality of actuators.

4. The information processing apparatus according to claim 1, wherein the setting unit is further configured to set the operation mode based on characteristics of a device in which the plurality of actuators are provided.

5. The information processing apparatus according to claim 1, wherein the setting unit is further configured to set the operation mode based on content provided to the user in synchronization with the vibration information.

6. The information processing apparatus according to claim 1, wherein the setting unit is further configured to set the operation mode based on operation information of the user for content provided to the user in synchronization with the vibration information.

7. The information processing apparatus according to claim 1, wherein the setting unit is further configured to set the operation mode based on a contact state of a device in which the plurality of actuators are provided and the user.

8. The information processing apparatus according to claim 1, wherein the setting unit is further configured to set the operation mode based on states of the plurality of actuators.

9. The information processing apparatus according to claim 1, wherein the setting unit is further configured to set the operation mode based on a sensing result of the vibrations output from the plurality of actuators.

10. The information processing apparatus according to claim 1, wherein the setting unit is further configured to set the first operation mode when the index indicates that the intermittency of the output vibration is easily identified based on the vibration information, and set the second operation mode when the index indicates that the intermittency of the output vibration is difficult to identify based on the vibration information.

11. The information processing apparatus according to claim 1, further comprising:
an editing unit that configured to rewrite the vibration information when the second operation mode is set and a sensing result of vibrations output from the plurality of actuators satisfies a predetermined condition.

12. The information processing apparatus according to claim 1, wherein the setting unit is further configured to select, from the plurality of actuators, one or more actuators that output the vibration, based on the vibration information.

13. The information processing apparatus according to claim 12, wherein the setting unit is further configured to select one or more actuators, which output the vibration based on the vibration information, based on at least any of content provided to the user in synchronization with the vibration information, a contact state of a device in which the plurality of actuators are provided and the user, or a state of the device.

14. The information processing apparatus according to claim 13, wherein the setting unit is further configured to select one or more actuators which output the vibration based on the vibration information, based on states and characteristics of the plurality of actuators.

15. The information processing apparatus according to claim 13, wherein the setting unit is further configured to select one or more second actuators having characteristics satisfying a predetermined condition instead of an overloaded first actuator based on characteristics of the first actuator.

16. An information processing method, comprising:
acquiring vibration information for outputting intermittent vibration to an actuator;
setting, by a processor, an operation mode of a plurality of actuators that output vibration to a same user based on the vibration information as a first operation mode in which a same actuator continuously outputs each intermittent vibration based on the vibration information or as a second operation mode in which the plurality of actuators share the intermittent vibrations while the same actuator discontinuously outputs each of the intermittent vibrations based on the vibration information; and
calculating an index of intermittency of output vibration based on the vibration information,
wherein the setting of the operation mode is based on the index.

17. A non-transitory computer-readable medium having embodied thereon a program, which when executed by a computer causes the computer to execute an information processing method, the method comprising:
acquiring vibration information for outputting intermittent vibration to an actuator;
setting an operation mode of a plurality of actuators that output vibration to a same user based on the vibration information as a first operation mode in which a same actuator continuously outputs each of the intermittent vibrations based on the vibration information or as a second operation mode in which the plurality of actuators share the intermittent vibrations while the same actuator discontinuously outputs each of the intermittent vibrations based on the vibration information; and
calculating an index of intermittency of output vibration based on the vibration information,
wherein the setting of the operation mode is based on the index.

* * * * *